United States Patent [19]

Haswell-Smith

[11] Patent Number: 4,866,665
[45] Date of Patent: Sep. 12, 1989

[54] BREAK POINTS SYSTEM IN A SOFTWARE MONITOR WHERE ENTRY ADDRESS OF BREAK POINT ROUTING EQUALS OP CODE OF CALL INSTRUCTION

[75] Inventor: Iain Haswell-Smith, Edinburgh, Scotland

[73] Assignee: Burr-Brown Ltd., Livingston, Scotland

[21] Appl. No.: 33,176

[22] Filed: Apr. 1, 1987

[30] Foreign Application Priority Data

Oct. 27, 1986 [GB] United Kingdom ............... 8625667

[51] Int. Cl.⁴ .................. G06F 11/30; G06F 9/22; G06F 9/42
[52] U.S. Cl. ........................... 364/900; 371/19
[58] Field of Search ... 364/200 MS File, 900 MS File; 371/19

[56] References Cited

U.S. PATENT DOCUMENTS

| | | | |
|---|---|---|---|
| 3,415,981 | 12/1968 | Smith et al. | 371/19 |
| 3,551,659 | 12/1970 | Forsythe | 371/19 |
| 3,903,503 | 9/1975 | Dillingham et al. | 340/146.3 |
| 3,987,420 | 10/1976 | Badaganani | 371/19 |
| 4,015,239 | 3/1977 | Fujumoto et al. | 340/146.3 |
| 4,028,663 | 6/1977 | Ryer et al. | 340/172.5 |
| 4,074,353 | 2/1978 | Woods et al. | 364/200 |
| 4,205,370 | 5/1980 | Hirtle | 374/200 |
| 4,214,305 | 7/1980 | Tokita et al. | 364/200 |
| 4,296,463 | 10/1981 | Dalboussiere et al. | 364/200 |
| 4,308,581 | 12/1981 | Raghunathan | 371/19 |
| 4,365,273 | 12/1982 | Yamada et al. | 358/260 |
| 4,453,214 | 6/1984 | Adcock | 364/200 |
| 4,493,022 | 1/1985 | Nicolas et al. | 364/200 |
| 4,498,135 | 2/1985 | Caudel | 364/200 |
| 4,499,538 | 2/1985 | Finger et al. | 364/200 |
| 4,506,322 | 3/1985 | Leigh | 364/200 |
| 4,524,454 | 6/1985 | Ejiri | 382/21 |
| 4,525,860 | 6/1985 | Boivie | 382/21 |
| 4,536,839 | 8/1985 | Shah et al. | 364/200 |
| 4,558,412 | 12/1985 | Inoshita et al. | 364/200 |
| 4,571,672 | 2/1986 | Hatada et al. | 364/200 |
| 4,577,282 | 3/1986 | Caudel et al. | 364/200 |
| 4,586,131 | 4/1986 | Caudel et al. | 364/200 |
| 4,635,193 | 1/1987 | Moyer et al. | 371/19 |

OTHER PUBLICATIONS

Kane et al., 68000 Assembly Language Programming, 1981, pp. 2–8, Osborne/McGraw-Hill, Berkeley, Calif.
Hughes et al., Breakpoint Design for Debugging Microprocessor Software, 1978, entire document, Computer Design/Nov. 1978.

Primary Examiner—Archie E. Williams, Jr.
Assistant Examiner—Leo Li Wang
Attorney, Agent, or Firm—Cahill, Sutton & Thomas

[57] ABSTRACT

In a system based upon a microprocessor, the instruction set of which includes only one trap instruction, a software monitor is provided in which the user can define and monitor software break points without using trap instructions, thereby leaving the entire instruction set available to a user to execute, develop, or debug software containing trap instructions. To accomplish this result, software break points are defined at desired addresses by replacing user instructions at such addresses with call instructions that call a monitor routine which handles software break points. The argument of the call instruction is made equal to its op code. The portion of the monitor that handles software break points is entered at an address equal to the op code of the call instruction inserted at the break point address. This procedure avoids overwriting errors that otherwise would occur when software break points are defined at consecutive locations of the user program. This is particularly relevant where a user may wish to single step through a user program executing one user instruction at a time using a "single-step command".

5 Claims, 3 Drawing Sheets

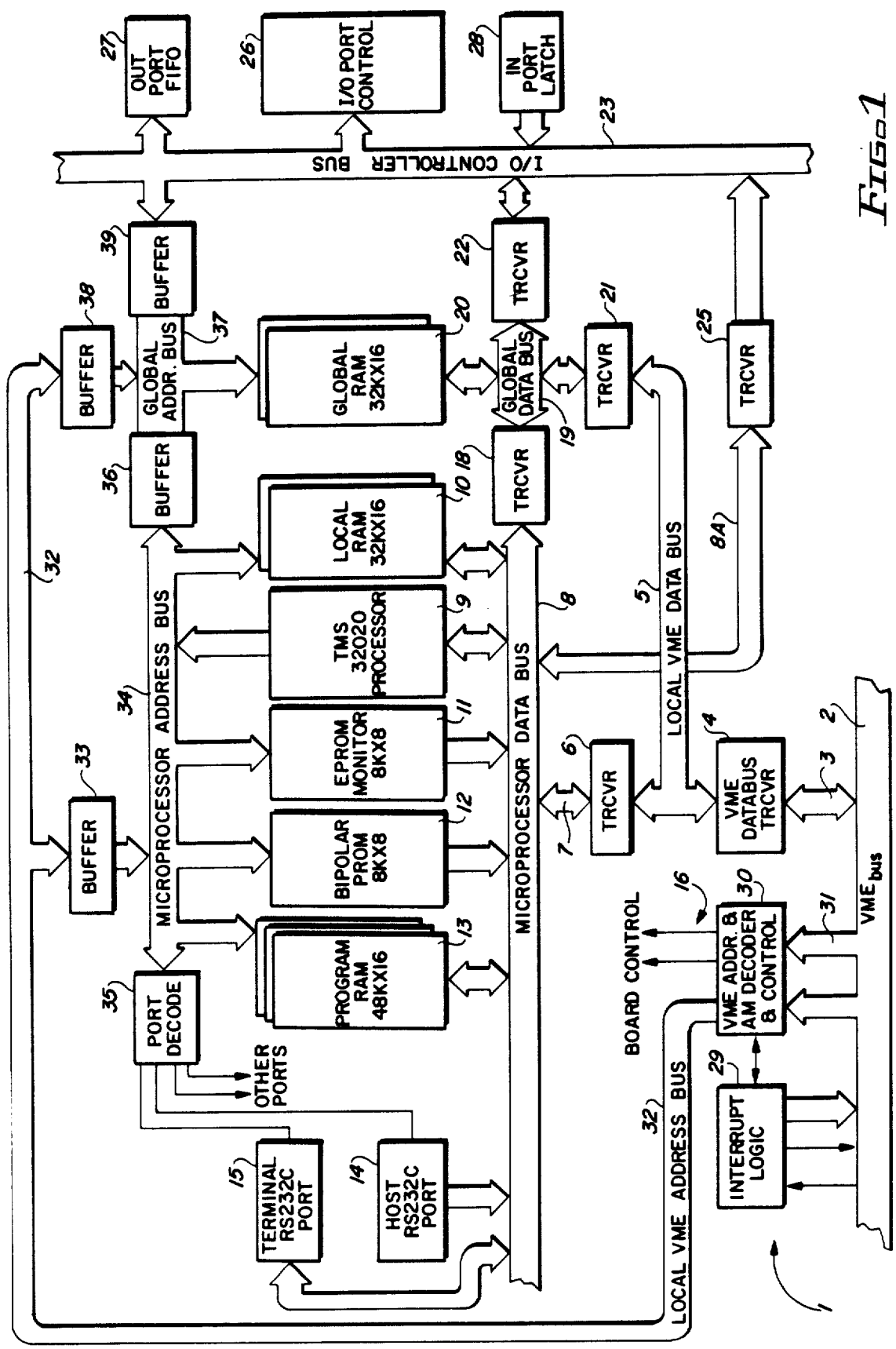

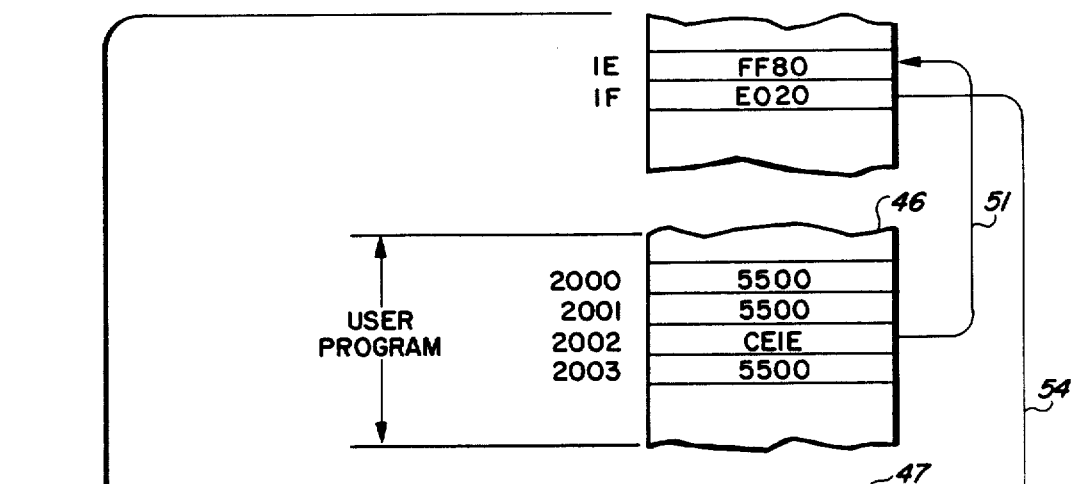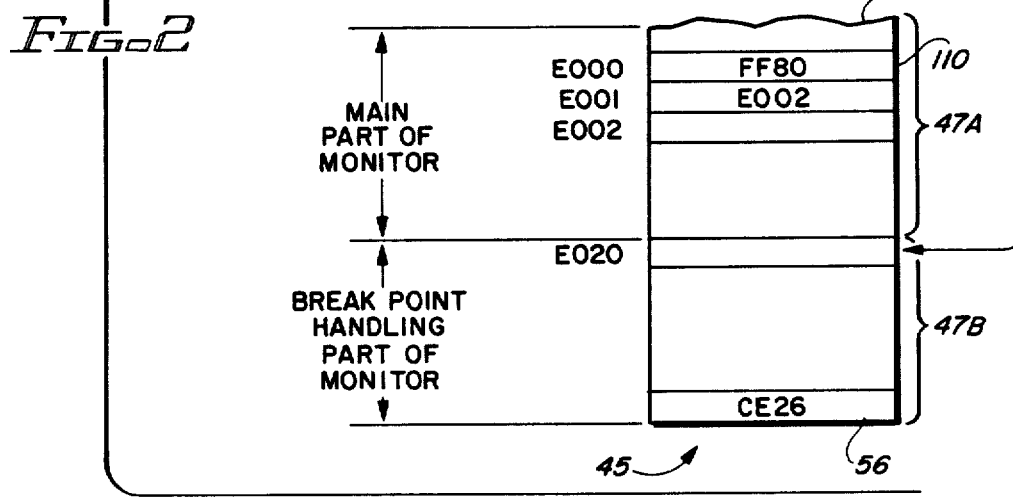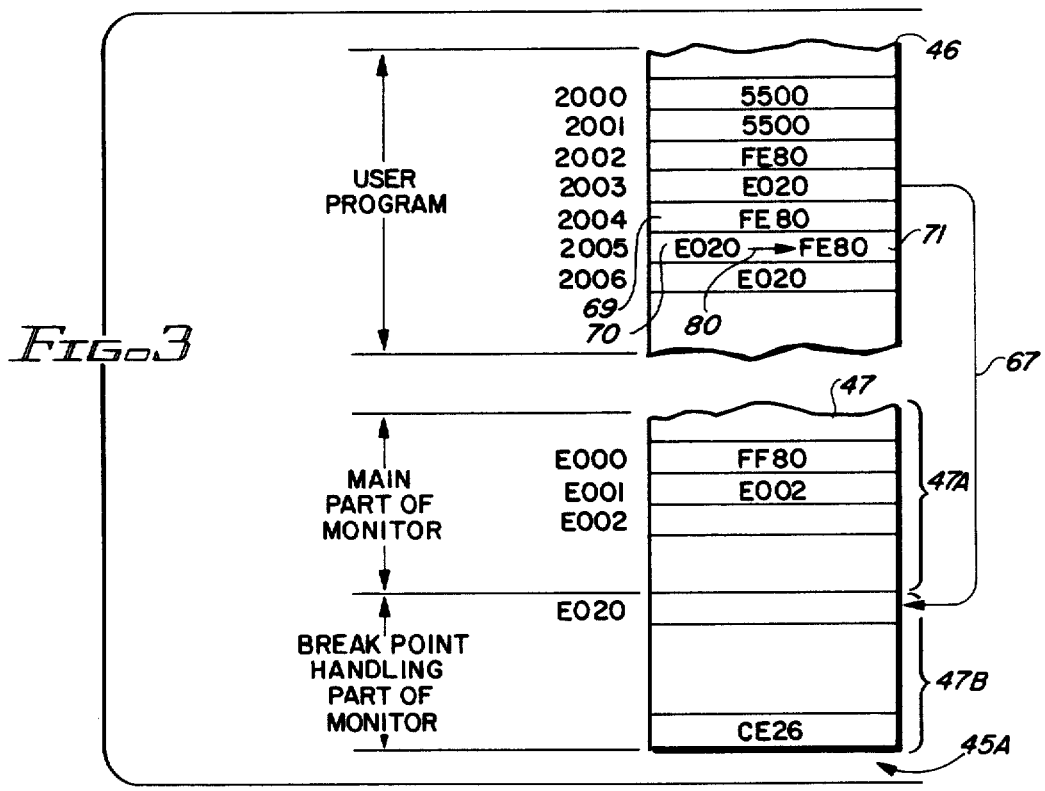

BREAK POINTS SYSTEM IN A SOFTWARE MONITOR WHERE ENTRY ADDRESS OF BREAK POINT ROUTING EQUALS OP CODE OF CALL INSTRUCTION

BACKGROUND OF THE INVENTION

The invention relates to "software monitors" that enable a user to define break points in user software being debugged or analyzed in order to allow the user to step through or otherwise advance through the user program and determine the contents of the registers of a processor at selected software break points.

Programs called software monitors, or simply "monitors", commonly are used in computer systems to enable engineers to "debug" or analyze software. A monitor typically enables an engineer to input "monitor commands" to the monitor by means of a terminal. The monitor commands are a set of commands, each of which usually consists of one to three letters. Such monitor commands enable a user to inspect and modify certain microprocessor variables or memory locations in a memory used by the microprocessor.

For example, a typical command is "display data memory", which when entered with a numeric address value via a terminal, instructs the software monitor to display on the terminal screen the contents of a certain number of memory locations, starting from the specified numeric address. Another typical command is a "modify register" command whereby the contents of a specified register of the microprocessor may be examined and modified. The monitor command set also contains commands to allow a user to load a user program into memory, run the user program, and halt the user program at a certain stage of its execution to examine the effect of the user program on the microprocessor registers and any relevant locations in memory.

To halt the execution of a user program, a software break point is set at the particular location in memory where a halt is desired. The software break point causes the microprocessor to stop executing the user program, save all the current values of its registers in a certain area of memory reserved for exclusive use by the monitor, and then start executing the monitor program.

A typical sequence of events would be as follows. From "power up" of a system based on a microprocessor, the system would automatically start running a resident software monitor program. This would allow monitor commands to be entered by means of a terminal. Using the monitor commands, the user would enter a user program into the system memory, starting at a certain address. The user then would initialize all the relevant microprocessor registers to the values required at the start of execution of the user program. In particular, the user program counter (which contains the address of the memory location containing the next user instruction to be executed by the microprocessor if it were running a user program) is set to the address value of the beginning of the user program. The user then would set a software break point in the user program using a "set break point" command. The software break point would be set at a particular memory address location within the user program where the user wants to halt the user program when it is being executed.

After all the relevant registers and memory locations have been initialized (using the available monitor commands with the microprocessor running the monitor program), the user would enter a "monitor run command". This would cause the microprocessor to stop executing the monitor program and start executing the user program from the initialized user program counter. The microprocessor would continue to execute the user program until the software break point is reached. At this point, the microprocessor would stop executing the user program, save all its register values in a reserved area of memory, and start executing the monitor program again. The only method by which a user program may be halted and the monitor program be started is to set a break point in the user program.

To accomplish this, the monitor "set break point" command replaces an instruction in the user program with a trap instruction at the address of each desired software break point and temporarily stores the replaced user program instructions. The "monitor run" command then runs the user software until the first break point, i.e., the first trap instruction, is encountered. It "vectors" to a two word branch instruction that calls the monitor subroutine which handles software break points and replaces every trap instruction with the user instruction that earlier was replaced by the trap instruction. The monitor also automatically displays on the terminal screen the contents of all registers of the processor at the time that the program counter of the processor encountered the break point trap instruction.

Debugging a user program entails checking that the user program executes exactly the expected sequence of operations that the user program is designed to carry out. Ideally, all registers of the processor and any memory location that the user program affects would be checked for the expected values after every user program instruction the processor executes. In practice, because of the length of most programs, this is not practical and all the program variables are only checked at certain carefully chosen positions within the user program where break points are defined.

When a problem is encountered, it often is desirable to "home in" on the user instruction or instructions that are causing the problem. This can be done by repeatedly redefining the position of the software break points so that they move closer together in the user program. In this way, shorter and shorter steps are taken between each break point when the user program is run. In the limiting case, a set of break points would be defined consecutively in locations in the user program wherein it is suspected that erroneous user program code exists. The user program would be run until the first break point is encountered. The program variables would be examined. The user program then would be run from the first break point to the second; in effect, one more user instruction would be executed and the program variables again would be examined. This process would be repeated.

However, any monitor allows only a certain maximum number of break points to be set (typically four to ten), so if the user wishes to continue one step execution of the user program past the last break point in the user program, the break point would have to be redefined.

Most monitors that are executed in a system using a microprocessor whose instruction set includes a trap instruction have a "singe step command" which easily enables a user program to be executed one instruction at a time The sequence of events of a monitor single step command are as follows The monitor examines the op code in the memory whose address is given by the value of the user program counter. This is the op code that the user program will first execute if the monitor run command is executed. The monitor decodes the op code to determine the length of the whole instruction (for example, one word or two words) and then places a trace instruction in the next location just after it (after first saving the user instructions there). Thus, the monitor effectively sets a break point immediately after the next user instruction that is about to be executed. The monitor then executes a run command (as part of the single step command). The user program instruction is executed and the program counter is incremented to the address value of memory that contains the trap instruction. The trap instruction is executed, causing the user program to be halted and the monitor program to execute. The monitor program saves all the processor register values and replaces the trap instruction with the original saved user instruction. The user program counter now contains the address value of the next user program memory instruction, so the user may now again execute another single step command in order to advance forward again. This process simply uses one break point that is always carefully placed one instruction ahead in the user program.

Some user instructions require a slight modification to the above sequence of events when executing a monitor single step command. For example, consider the case when the user instruction about to be executed is a conditional branch instruction as shown by the memory diagram of FIG. 5. As the conditional branch 90 is executed, depending on the value of a flag that previously has been set, the user program either will branch to address 1005 or address 1006, as indicated by reference numerals 91 and 92, respectively. Hence, not only must a trap instruction be placed in location 1005 (after first saving the user instruction there), but another trap instruction also must be placed at address 1006, designated by reference numeral 92. Thus, a trap instruction always will be executed next, regardless which direction the branch instruction takes.

FIG. 5 also illustrates why typically only microprocessors containing a trap instruction as part of their instruction set are able to provide the single step monitor command. Consider a "call subroutine" instruction being used in place of the trap instruction. The call subroutine instruction is a two word instruction. So although a break point could be set at location 1005 of FIG. 5 by placing the call instruction op code at location 1005 and the argument of that op code at location 1006, the argument would be overwritten by the call instruction op code of the second break point being placed at 1006 with its argument at location 1007. Execution of the first call instruction op code at location 1005 then would cause an error in the monitor. This problem does not arise using the trap instruction to implement the single step monitor command, as the trap instruction is a single word instruction.

Many commonly used microprocessors include a number of trap instructions in their instruction sets, each of which "vectors" to a different predetermined location. Recently, however, high performance, high speed microprocessors having so-called "limited instruction sets" are being utilized for certain applications, such as high speed digital signal processors (DSP's). However, some such microprocessors contain no trap instructions, while others, such as the Texas Instruments TMS32020 include only one trap instruction in their instruction set. Although the single trap instruction could be used to write a software monitor for a TMS32020-based digital signal processing system, this would make that trap instruction unavailable for use in software to be executed by the system It would be very desirable to be able to provide an efficient software monitor for a TMS32020 based system, and yet make the entire limited instruction set thereof available to the system user.

SUMMARY OF THE INVENTION

Accordingly, it is an object of the invention to provide a software monitor for a microprocessor-based system that does not utilize trap instructions.

It is another object of the invention to provide an efficient software monitor for a system utilizing a TMS32020 microprocessor or a microprocessor having only one trap instruction that allows the entire limited instruction set thereof to be available for user programs.

It is another object of the invention to provide a software monitor for a limited instruction set microprocessor-based system that requires a minimum amount of available memory to accomplish the desired software monitoring functions and requires a minimum amount of time for carrying out the desired software monitoring functions.

Briefly described, and in accordance with one embodiment thereof, the invention provides a software monitor that operates without use of trap instructions, yet avoids errors due to overwriting of the argument of one break point instruction by the op code of another break point instruction when software break points are defined at consecutive addresses of a user program. In the described embodiment of the invention, a software monitor is provided in a digital signal processing system based upon a limited instruction set microprocessor, such as a TMS32020 16-bit microprocessor including only one trap instruction in its instruction set. For each desired break point address in the user program, the monitor, when initially commanded to run, replaces the user program instruction at the desired break point address with the op code of a call instruction and also replaces the subsequent instruction with the argument or address to be called by the call instruction. The monitor also temporarily saves the two replaced user instructions. Using the monitor, the user then may automatically run the user program until the first call instruction is encountered at the first software break point address and obtain the address of the portion of the monitor routine that handles software break points. The monitor also saves the address of the first break point, i.e., the current contents of the program counter, and the other registers of the microprocessor on a stack, and jumps to the portion of the monitor routine that handles break points. The monitor break point handling subroutine then replaces the first call instruction and its argument with the two user instructions originally replaced and displays the contents of all the microprocessor registers at the time that the program counter of the processor encountered contains the address of the first break point. The software monitor then returns to its beginning to await the next monitor command. If a new "monitor run" command is entered, the monitor runs the user program from the last software break point to the next, whereat the foregoing sequence is repeated. In order to prevent the op code of a second call instruction that is inserted to define a second break point at a second address from overwriting the argument of a first call instruciton that is intended to define a first software break point at an address immediately preceding the second break point address, the portion of the software monitor that handles break points is located in an address memory having a value equal to the op code of the call instructions. Then, even if the argument of a first call instruction defining a first break point is overwritten by the op code of the second call instruction defining a second break point at the next consecutive address after the first break point, execution of the software monitor nevertheless results in calling the portion of the monitor that handles break points.

BRIEF DESCRIPTION OF THE DRAWINGS

FIG. 1. is a block diagram of a digital signal processor containing the software monitor of the present invention.

FIG. 2 is a diagram illustrating a portion of a memory map of the microprocessor included in FIG. 1, and is useful in explaining the operation of a typical prior art software monitor utilizing a trap instruction.

FIG. 3 is a partial memory map of the microprocessor included in FIG. 1 and is useful in explaining several problems that occur as a result of using a call instruction instead of a trap instruction to implement a software monitor.

DETAILED DESCRIPTION OF THE INVENTION

Figure 4:
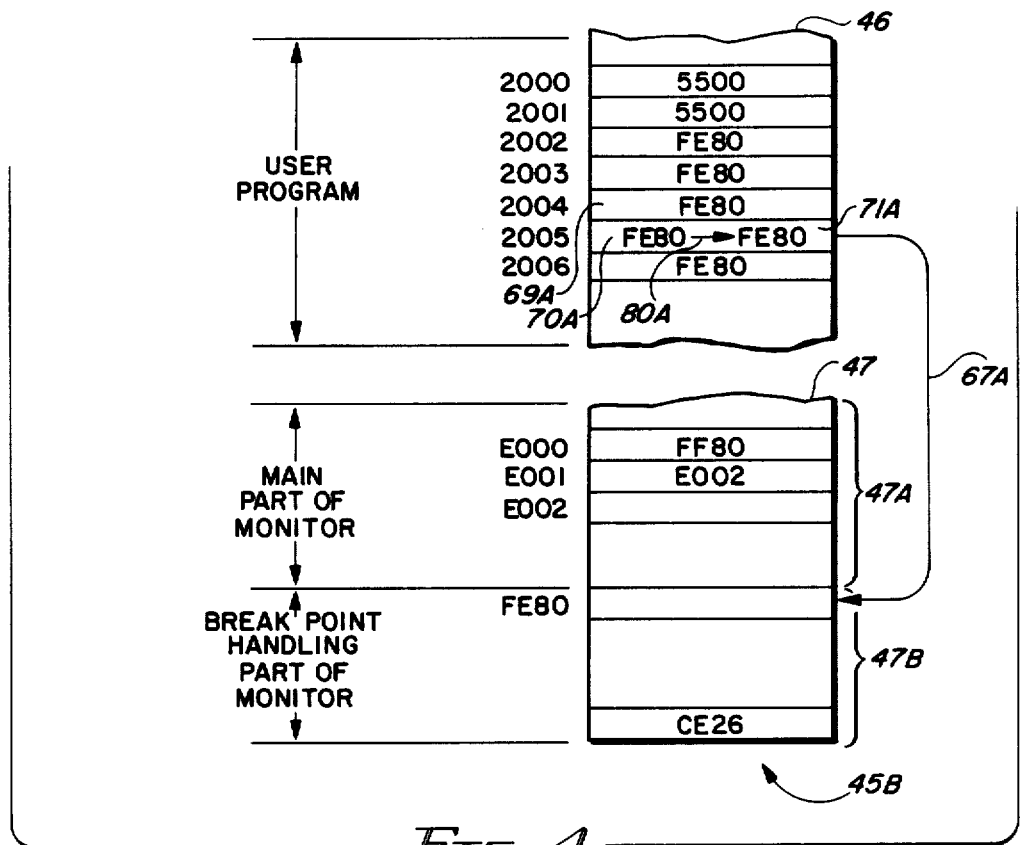
FIG. 4 is a partial memory map of the microprocessor in the system of FIG. 1 useful in explaining the implementation of the software monitor of the present invention.
Figure 5:
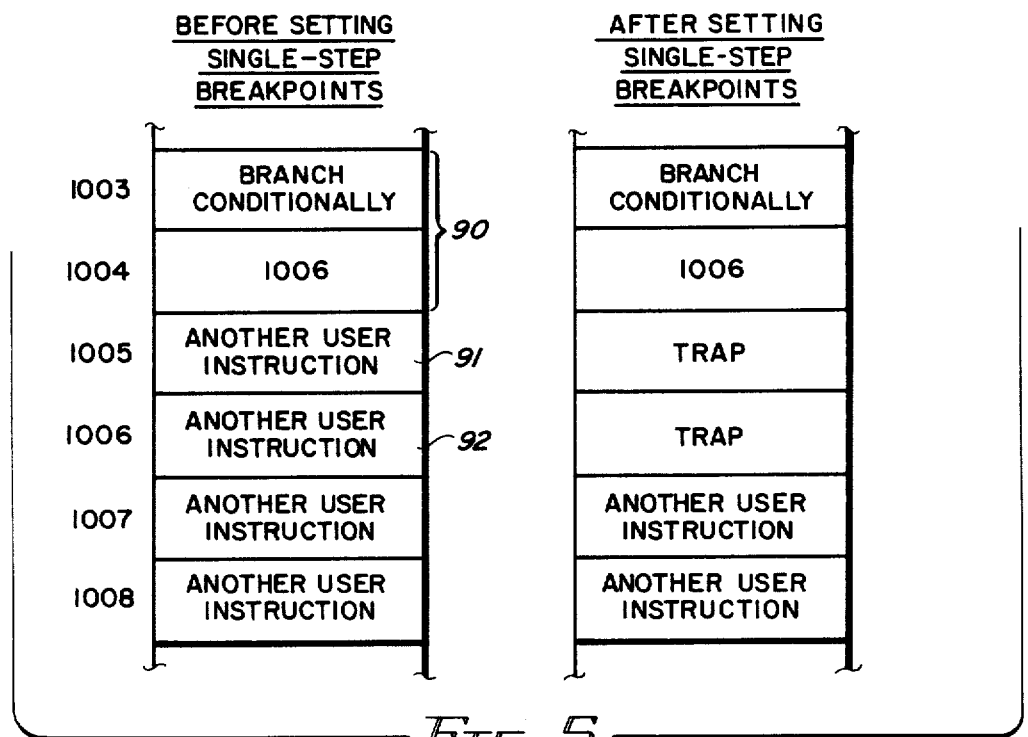
FIG. 5 is a memory map diagram that is useful in describing certain problems solved by the invention.

Before describing the software monitor of the present invention in detail, it may be helpful to first refer to FIG. 1 and briefly describe the digital signal processor 1 in which the software monitor of the described embodiment of the invention is included. Digital signal processor 1 includes a standard VME bus 2 coupled by data bus conductors 3 to a transceiver 4, which in turn is coupled by a local data bus 5 and transceivers 6 and 21 to a microprocessor data bus 8 and a global data bus 19. Bus 2 is coupled by circuitry 30, a local address bus 32, buffer 33 and buffer 38 to microprocessor address bus 34 and global address bus 37. The above-mentioned TMS32020 microprocessor 9, local RAM 10, PROM 12, and RAM 13 are connected to address bus 34 and data bus 8. EPROM (electrically programmable read-only memory) monitor 11, which stores the software monitor program of the present invention, also is connected to address bus 34 and data bus 8.

Global RAM 20 is coupled to I/0 bus 23 by buffer 39 and transceiver 22 and to address bus 34 and data bus 8 by buffers 36 and 18, respectively. I/0 port control circuit 26 controls communication between I/0 bus 23, output port 27, and input port 28.

The above-described type of digital signal processor needs to provide high speed digital signal processing functions at maximum speed with minimum use of available memory. It is desirable that the software monitor of block 11 utilize as little memory space as possible both in EPROM 11 and also utilize as little of local RAM 10 in its operation as possible and effectuate the software monitoring functions at adequate speed.

Port decode circuit 35 allows microprocessor 9 to access a terminal port 15, which can be a conventional RS232C port, allowing software monitor commands to be input by the user to the digital signal processor 1 and to allow break points to be readily defined by the user, as subsequently explained.

To understand the operation of the invention, it will be helpful to understand in yet more detail how a typical prior art software monitor would be implemented in the system of FIG. 1. Referring to FIG. 2, memory map 45 of the TMS32020 microprocessor 9 includes a user program section 46, beginning with address 2000 hexadecimal. (All addresses given in the examples herein are hexadecimal addresses) The typical software monitor program is included in section 47 of memory map 45, beginning with the address E000. The software monitor, includes a main part 47A and a "break point handler" section 47B that begins at address E020. The break point handler 47B continues to a location 56 containing the op code CE26 of a RETURN instruction.

A typical procedure to set software break points and run a typical prior art software monitor in the system of FIG. 1 will be described next. First, when the microprocessor is powered up, it outputs an address 0000 to fetch the first instruction. Since address 0000 normally will contain random data as the microprocessor 9 is powered up, decode circuitry is provided to translate the address 0000 to the first address in ROM (read-only memory), which is the address E000 in this case. The location E000 contains a branch instruction having the op code FF80, as indicated by reference numeral 110 in FIG. 2. The "argument" of the BRANCH instruction, i.e., the address to which the program will branch if the condition of the branch instruction is satisfied, is contained at the address E001, and is set to be the address E002, which is the address of the first instruction of the software monitor program. This technique gets the system into the monitor automatically upon powering up of the system, but is not pertinent to further operation of the system or the software monitor.

After the system is powered up, the user wishing to operate the software monitor will define various software break points in the user program stored in section 46 of the memory map 45. As mentioned above, typical prior art software monitors utilize trap instructions in monitor programs to set software break points. A trap instruction is a single word instruction that contains a fixed vector. When the trap instruction is encountered by microprocessor 9, it jumps to the address pointed to by the trap instruction.

To use the typical software monitor being described, the user first defines all of the desired break points in the user program by means of a "set break point at address" monitor command. Relevant registers of the microprocessor also are set using the appropriate monitor "modify register" command and in particular, the program counter is set to the address value of the beginning of the user program. To this end, the user lists the addresses of software break points at which the user wishes to know the contents of all of the various registers of microprocessor 9, using a "display break points" monitor command.

Then the user inputs a "monitor run" command to the system. Execution of the (monitor run) command causes the instruction at the address of each break point to be replaced by a trap instruction, and also causes each replaced user instruction to be temporarily stored. The execution of the monitor run command then causes the monitor program to enter and run the user program stored in section 46 of the memory map in FIG. 2. The user program is entered at address 2000, and the user program instructions are executed until the address of the first break point is encountered. In the example of FIG. 2, addresses 2000 and 2001 are illustrated as containing the instruction op code 5500, which is the TMS32020 "no op" instruction op code, purely for convenience of illustration. As a practical matter, there actually might be a large number of various instructions executed before the address of the first break point is encountered. In the present example, it is assumed that the first break point address is 2002, which in FIG. 2 contains CE1E, the op code of the TMS32020 trap instruction.

This causes the microprocessor to jump from address 2002 to address 1E, which is the preset vector to which the trap instruction always jumps when encountered by the TMS32020 microprocessor. Arrow 51 in FIG. 2 indicates this jump from the trap instruction at address 2002. Location 1E of the program memory contains the op code FF80, which is the op code of a branch instruction. The branch instruction is a two word instruction that contains its argument in the next consecutive address, namely address 1F. In this example, the argument of that branch instruction is the address E020 of the entry point of the software monitor portion 47B that handles break point operations.

As indicated by arrow 54 in FIG. 2, the microprocessor then jumps to address E020 The monitor program then saves the contents of all of its registers on the stack. (There are two forms of "stack". The first form is the stack contained within the microprocessor chip. For the TMS32020 this stack consists of four registers which may be used to store four values as desired. A second form of stack is an actual area of memory external to the microprocessor reserved for use by the microprocessor to store certain variables. Clearly this second form of stack can be as large as desired, memory space permitting. When the monitor program is entered via a software break point, the monitor saves all the microprocessor register values in memory (the second form of stack). This means a monitor command such as "display registers" actually reads this area of memory and displays the contents thereof. If the monitor "run" command is executed to run a user program the monitor reloads all the saved register values from memory back into the processor, including the previously saved program counter value, and then restarts execution of the user program from the reloaded program counter value. The SPV120 monitor actually only uses one of the registers of the internal stack within the microprocessor This swapping back and forth of all the microprocessor register values between the microprocessor and memory when a user program or a monitor program is halted or started is known technically as a "context switch.")

The monitor then executes the instructions of the break point handling portion of the monitor routine beginning with address E020, and replaces the trap instruction at location 2002 with the user instruction that was originally stored at that address and displays the saved contents of all of the microprocessor registers corresponding to break point address 2002. The monitor then returns to the beginning of its main section 47A and awaits the next monitor command. Appendix A attached hereto contains a list of monitor commands for the monitor contained in EPROM 11 and is typical of monitor command sets.

If the next monitor command is a monitor run (i.e., "execute program code") command, the microprocessor jumps to location 2003 of the user program, and continues to execute the user program until the next break point is encountered, and from that point on repeats the above-described procedure.

As previously mentioned, using a typical monitor of the type just described for the system described in FIG. 1 with a TMS32020 microprocessor would deprive the user of the capability of using a trap instruction in any user program, because the TMS32020 only contains the one trap instruction used in the monitor program.

In accordance with the present invention, a software monitor is provided which does not use the trap instruction, but instead uses a call instruction. It is believed that no one has provided a software monitor in a system based on the TMS32020 limited instruction set microprocessor because of the undesirability of depriving the user of the ability to execute trap instructions and because the other instruction of the TMS32020 instruction set that might be used (a call instruction) requires two words of memory, thus doubling the amount of memory required to define break points in the user program and doubling the amount of memory required to store user instructions which must be replaced in the user program in order to define the break points.

Next, the memory map 45A of FIG. 3 will be referred to in describing a software monitor containing call instructions instead of trap instructions to define desired software break points in the user program to be monitored In the memory map 45A of FIG. 3, the user program is contained in section 46, and the software monitor program is contained in section 47, which contains a main section 47A and a break point handling section 47B. As in the typical software monitor described with reference to FIG. 2, FIG. 3 shows no op (no operation) instruction op codes to designate various instructions that could be contained in the user program. It is assumed that the first desired break point to be inserted by the software monitor in the user program occurs at address 2002. The address 2002 contains FE80, which is the op code of the call instruction. The next location, 2003, contains the address E020 at which the break point handling subroutine 47B is entered. Arrow 67 shows microprocessor 9 jumping from address 2003 to address E020, the entry point of the break point handling monitor routine.

It can be readily seen that the original user instructions at both addresses 2002 and 2003 must be temporarily stored in order for the software monitor to define the break point at location 2002 of the user program.

At this point, it should be apparent that a software monitor defining break points by means of call instructions instead of trap instructions will enter the break point handling routine 47B directly from the argument of the inserted call instruction only if the next break point is not defined at location 2003, because if a second break point were to be defined at address 2003, its FE80 op code would overwrite the argument E020 of the first break point instruction the op code of which is at address 2002. Therefore, the nearest next break point that can be defined is at address 2004, wherein the op code FE80 designated by reference numeral 69 in FIG. 3 is shown, with its argument E020 being inserted at address 2005, replacing the original instruction(s) at those locations. To further illustrate the above problem, assume that a third break point is desired at the next address 2005. To define this break point in the manner described earlier, op code FE80 of the third call instruction, designated by reference numeral 71, will overwrite the argument E020 of the second call instruction, designated by reference numeral 70. Arrow 80 designates this destroying of the monitor address which the second call instruction should call.

Therefore, when the user program later is run by the software monitor, when the second break point 69 is encountered the program will not jump to monitor address E020, but will jump to some other address FE80 when the program counter reaches 2005, causing erroneous operation.

In order to overcome this problem, and in accordance with the present invention, the arrangement indicated in memory map 45B of FIG. 4 is utilized, wherein the break point handling section 47B of the monitor is entered at the address FE80 instead of E020. Then, the argument of the call instruction, namely FE80, can be set equal to its op code. Then, the first break point address 2002 contains the call op code FE80 and its argument FE80 is contained in address 2003. This causes the monitor program to call the break point handling subroutine 47B at address FE80.

When a second break point at address 2004 is defined by the call instruction op code FE80 designated by reference numeral 69A, its argument FE80 designated by reference numeral 70A is written into address 2005. If a third break point is defined at address 2005 by the call instruction op code FE80 designated by reference numeral 71A, the argument 70A is overwritten (as indicated by arrow 80A) by the FE80 op code 71A of the call instruction defining the third break point at address 2005, before the user program and break point handling subroutine 47B are ever executed However, when the user program is run, and the call instruction at location 2004 is executed, the break point handling section 47B of the monitor is properly entered at address FE80 because the argument of the second call instruction is equal to the op code that overwrites it.

Normally, the monitor program inserts all break points or clears all break points as one operation. However, consider a user who has set (by the "set break point" command) two break points in the user program at locations 2004 and 2005. The current value of the user program counter contained in the memory stack of the monitor is 2003. The break points have not yet actually physically been inserted into the user program, but the user instructions at locations 2004, 2005, and 2006 have been saved (by execution of the set break point command). The addresses to insert a break point (2004 and 2005) also have been saved. The user now enters the RUN command to run his program. A "context switch" is performed, i.e., all the user register values are loaded from the monitor memory stack into the microprocessor. Next, all the software break points are written into the user program. I.e., the code FE80 is written into locations 2004, 2005, and 2006. The user program then is run. The first break point is reached and control returns to the monitor. Then, the monitor clears all the break points, i.e., replaces the code FE80 in locations 2004, 2005, and 2006 with the original user instructions. The user then can enter the RUN command again.

Again, all the user register values are loaded from the memory stack into the microprocessor. Now, however, the program counter register is 2004. If the monitor now writes all the break points into the user program, a first break point at that address would again be immediately executed. The user program would not be able to advance past location 2004. In this case, the monitor only physically writes in a second break point at location 2005 into the user program. Once the second break point at location 2005 is reached and control returns to the monitor, the monitor then clears all the break points by reinserting the original user instructions as usual.

Thus, in general, the monitor sets or clears all break points as one operation. If however, any break point location is equal to the current value of the user program counter or the program counter less one, then that particular break point is not set. (This design was a matter of choice-not necessity. In some respects it might be sensible to take the viewpoint that if a user tries to start running a user program, the start of which contains a break point, that break point will always halt the user program at its start.)

It should be noted that only the call instruction can be used in the manner described above to define software break points. The reason is that when the call instruction is executed, the current value of the program counter of the microprocessor is pushed onto the hardware stack contained within the TMS32020 microprocessor. The argument of the call instruction then is placed in the program counter of the microprocessor so that the program will start executing the called subroutine. Note, however, that the original value of the program counter has been saved. At the end of the subroutine a return instruction is executed. This causes the microprocessor to pull off the saved program counter contents from the stack and place them back in the program counter register so that the program may resume its execution from just after where it called the subroutine. This is important if the subroutine being called is part of a software monitor. It means that the software monitor now knows where in the user program the subroutine was called because it can examine the stack to determine the saved program counter. Other instructions, such as a branch instruction, do not cause the current counter value to be saved on the hardware of the microprocessor.

The above-described software monitor program provides the benefit of allowing the user program to utilize the entire limited instruction set of the TMS32020 processor, and avoids errors in monitor operation if software break points at consecutive addresses of the user program are desired. For example, a user program may use a trap vector by initializing to point to the monitor so the user can if he wishes, use it in his program like a software break point that causes control to swap from the executing user program to the monitor. However, the user can also use the trap for his own purpose, to call a subroutine for example, by changing the trap vector address to point to his own subroutine.

This is particularly relevant for the implementation of a monitor single-step command. As previously described, a software monitor single-step command enables each instruction of the user program to be executed one instruction at a time. Normally this monitor command cannot be provided in software by monitors which execute on a microprocessor whose instruction set does not include a trap instruction.

If the microprocessor instruction set does include a trap instruction, the trap instruction is normally used to implement the single-step monitor command thus depriving the user of the user of the trap instruction in the user program.

Appendix B, attached hereto, is a listing of a portion of the relevant portions of the software monitor program in EPROM 11, including the portion that handles software break points in accordance with the present invention Sections 10-15, 31 and 35 of the memory map on the last two pages of the listing are relevant to this invention.

While the invention has been described with respect to a number of embodiments, those skilled in the art will be able to make various modifications to the described embodiment without departing from the true spirit and scope of the invention. It is intended that all techniques which are equivalent to those described herein in that they perform substantially the same function in substantially the same way to achieve the same result are within the scope of the invention.

Appendix A

The following table is a list of all of the commands showing their most immediate form of execution.

| Command | Description |
|---|---|
| ACH \<new value\> | Modify High Accumulator Register |
| ACL \<new value\> | Modify Low Accumulator Register |
| AR0 \<new value\> | Modify AR0 Register |
| AR1 \<new value\> | Modify AR1 Register |
| AR2 \<new value\> | Modify AR2 Register |
| AR3 \<new value\> | Modify AR3 Register |
| AR4 \<new value\> | Modify AR4 Register |
| BMS \<new value\> | Modify Bottom Middle of Stack |
| DAR | Display Registers |
| DBP | Display Breakpoints |
| DDM \<address\> | Display Data Memory |
| DIS \<address\>\<number\> | Disassemble Program Code |
| RUN | Execute Program Code |
| DPM \<address\> | Display Program Memory |
| FDM \<address\>\<number\>\<value\> | Fill Data Memory |
| FPM \<address\>\<number\>\<value\> | Fill Program Memory |
| HLP | Help |
| LO1 | Load Program Code via Port 1 |
| LO2 | Load Program Code via Port 2 |
| MDM \<address\> | Modify Data Memory |
| MPM \<address\> | Modify Program Memory |
| PC \<new value\> | Modify Program Counter |
| PRH \<new value\> | Modify High Product Register |
| PRL \<new value\> | Modify Low Product Register |
| SBP \<address\> | Set Breakpoints |
| CBP \<address\> | Clear Breakpoints |
| SS | Single Step Program Code |
| ST0 \<new value\> | Modify Status Register 0 |
| ST1 \<new value\> | Modify Status Register 1 |
| TEST | Self Test Routine |
| TM | Transparent Mode Command |
| TMS \<new value\> | Modify Top Middle of Stack |
| TOS \<new value\> | Modify Top of Stack |
| TR \<new value\> | Modify T Register |

APPENDIX B

```
        IDT      'S12056'

* 7.8.86

DEF      SBSSI
        REF      SBSSO

DEF      LDASB
        DEF      LDAINT

REF      QURMSG      * cmd module
        REF      NEWLIN      * cmd module
        REF      SPACE6      * cmd module
        REF      SPACE4      * cmd module REF      MESSAG      * i/o module
        REF      GETLIN      * i/o module
```

```
            REF     MAIN            * m module
            REF     COMERR          * m module
            REF     GETWRD          * m module
            REF     INUMBR          * m module
            REF     OUTHEX          * m module

LDASB       DSEG
            BSS     >13
LDAINT      BSS     >4
            DEND

CSEG    'STORE'

TEMP        BSS     1
TEMP1       BSS     1
TEMP2       BSS     1
TEMP3       BSS     1
TEMP4       BSS     1
TEMP5       BSS     1
TEMP6       BSS     1
TEMP7       BSS     1
TEMP8       BSS     1
TEMP9       BSS     1

CEND

PSEG

CR          EQU     >0D
LF          EQU     >0A
EOT         EQU     >04

TRUE        EQU     1
HEX         EQU     >10
STRPTR      EQU     AR3
MARK        EQU     TEMP3           * Used for single step routine
ADRR        EQU     TEMP4
            DATA    $SB+2
            DATA    $SB+3           * Next in help menu.
            B       SB              * Pointer to code
            DATA    >2              * Command word length
            DATA    'S'             * Command word string (6 chars)
            DATA    'B'
            DATA    ' '
            DATA    ' '
            DATA    ' '
            DATA    'S'
            DATA    'E'
            DATA    'T'
            DATA    ' '
            DATA    'B'
            DATA    'R'
            DATA    'E'
            DATA    'A'
            DATA    'K'
            DATA    'P'
            DATA    'O'
            DATA    'I'
            DATA    'N'
            DATA    'T'
            DATA    ' '
            DATA    ' '
            DATA    ' '
            DATA    ' '
            DATA    ' '
            DATA    ' '
            DATA    EOT
```

```
SBOVF   DATA    'E'
        DATA    'R'
        DATA    'R'
        DATA    'O'
        DATA    'R'
        DATA    ':'
        DATA    ' '
        DATA    'M'
        DATA    'A'
        DATA    'X'
        DATA    ' '
        DATA    'B'
        DATA    'R'
        DATA    'E'
        DATA    'A'
        DATA    'K'
        DATA    'P'
        DATA    'O'
        DATA    'I'
        DATA    'N'
        DATA    'T'
        DATA    'S'
        DATA    ' '
        DATA    '='
        DATA    ' '
        DATA    '4'
        DATA    CR
        DATA    LF
        DATA    EOT
SB      CALL    GETWRD          * Fetch breakpoint address LARP    STRPTR          * If *STRPTR <> CR
        LAR     AR1,*,1         *   Then
        LARK    AR0,CR          *
        CMPR    0
        BBNZ    COMERR LARK    AR1,HEX         * Convert ascii text to hex
        CALL    INUMBR
        SAR     AR1,ADRR        * Save address   ADRR LAR     AR2             * Check for errors
        LARK    AR0,+0          * If ERROR <> 0
        CMPR    0               *   Then
        BBZ     COMERR          *     Goto COMERR SBABS   CALL    GETWRD          * If *STRPTR <> CR
        LARP    STRPTR          *   Then
        LAR     AR1,*,1         *     Goto COMERR
        LARK    AR0,CR
        CMPR    0
        BBZ     COMERR LARK    AR1,>0          * Not executing single-step module
        SAR     AR1,MARK        * MARK = 0

SBSSI   LARP    AR1             * EnTrY pOiNt fOr SS mOdUlE
        LAR     AR1,MARK        * If MARK = 0
        LARK    AR0,>0           *   Then
        CMPR    0               *     Begin  (not using SS module)
        BBZ     SBOK            *       Check max bkpnts not set
        LRLK    AR1,LDASB       *       AR1 = &LDASB
        LARK    AR0,>A          *       AR1 = AR1 + A
        MAR     *0+             *       If *LDASB > AR1
        LAR     AR0,LDASB       *         Then
        CMPR    1               *           Output Overflow msg and Exit
        BBZ     SBTTT
        LRLK    AR1,SBOVF
        CALL    MESSAG
        B       SBEND SBTTT   LRLK    AR1,LDASB       *       Check bkpnt not already set
```

```
SBCHK   MAR     *+              *       AR1 = &LDASB ; AR1 = AR1 + 1
        LAR     AR0,LDASB       *       AR0 = *LDASB
        CMPR    0               *       WHILE AR1 <> AR0
        BBNZ    SBOK            *         If *AR1 = ADRR
        LAR     AR0,ADRR        *         Then
        LAR     AR2,*+          *           Exit
        MAR     *+,2            *         AR1 = AR1 + 2
        CMPR    0               *       End
        BBNZ    SBEND,*,1
        B       SBCHK SBOK    LAR     AR1,LDASB       * AR1 = LDASB
        LAR     AR0,ADRR        * *AR1 = ADRR    (save address)
        SAR     AR0,*+          * AR1 = AR1 + 1
        ZALS    ADRR            * ACL = ADRR
        TBLR    *+              * *AR1 = *ACL ; AR1- 1+1 (save 1st instruction)
        ADLK    >1              * ACL = ACL + 1          (save 2nd instruction)
        TBLR    *+              * *AR1 = *ACL ; AR1=AR1+1
        SAR     AR1,LDASB       * LDASB = AR1   (save new free loc pntr)

SBEND   LARP    AR1             * If MARK <> 0
        LAR     AR1,MARK        *   Then
        LARK    AR0,>0          *     BRANCH TO SB MODULE
        CMPR    0
        BBNZ    SBNUT
        B       SBSSO
SBNUT   LRLK    AR1,NEWLIN      *   Else
        CALL    MESSAG $SB     B       MAIN            *       Return to MAIN

PEND
        END

IDT     'S120DB'

* 01.08.86

REF     LDASB           * sb module

REF     NEWLIN          * cmd module

REF     MESSAG          * i/o module
        REF     GETLIN          * i/o module REF     MAIN            * m module
        REF     COMERR          * m module
        REF     GETWRD          * m module
        REF     OUTHEX          * m module

CSEG    'STORE'

TEMP    BSS     1
TEMP1   BSS     1
TEMP2   BSS     1
TEMP3   BSS     1
TEMP4   BSS     1
TEMP5   BSS     1
TEMP6   BSS     1
TEMP7   BSS     1
TEMP8   BSS     1
TEMP9   BSS     1

CEND

PSEG

CR      EQU     >0D
ECT     EQU     >04
```

```
STRPTR   EQU    AR3
DBNUM    EQU    TEMP3
DBADD    EQU    TEMP4

DATA   $DB+2
         DATA   $DB+3          * Next in help menu.
         B      DB             * Pointer to code
         DATA   >2             * Command word length
         DATA   'D'            * Command word string (6 chars)
         DATA   'B'
         DATA   ' '
         DATA   ' '
         DATA   ' '
         DATA   ' '
         DATA   'D'
         DATA   'I'
         DATA   'S'
         DATA   'P'
         DATA   'L'
         DATA   'A'
         DATA   'Y'
         DATA   ' '
         DATA   'B'
         DATA   'R'
         DATA   'E'
         DATA   'A'
         DATA   'K'
         DATA   'P'
         DATA   'O'
         DATA   'I'
         DATA   'N'
         DATA   'T'
         DATA   'S'
         DATA   ' '
         DATA   EOT
DBMSG    DATA   '1'
         DATA   '.'
         DATA   ' '
         DATA   EOT
         DATA   '2'
         DATA   '.'
         DATA   ' '
         DATA   EOT
         DATA   '3'
         DATA   '.'
         DATA   ' '
         DATA   EOT
         DATA   '4'
         DATA   '.'
         DATA   ' '
         DATA   EOT
DB       CALL   GETWRD LARP   STRPTR         * If word <> CR
         LAR    AR1,*,1
         LARK   AR0,CR         *   then
         CMPR   0
         BBZ    COMERR         *     goto COMERR LARP   AR1
         LRLK   AR1,DBMSG
         SAR    AR1,DBNUM      * Set up msg pntr
         LRLK   AR1,LDASB
         MAR    *+
         SAR    AR1,DBADD      * Set up address pntr DBAGN    LAR    AR0,LDASB      * Check if breakpoint to
         CMPR   0              * display
         BBNZ   DBEND
```

```
        LRLK    AR1,NEWLIN      * Output newline
        CALL    MESSAG

LAR     AR1,DBNUM
        CALL    MESSAG          * Display bkpnt number

LARP    AR1
        LAR     AR1,DBADD
        LAR     AR1,*           * Fetch DBADD
        LARK    AR2,+5
        CALL    OUTHEX          * Display address at which bkpnt set LARP    AR1
        LAR     AR1,DBNUM
        LARK    AR0,>5
        MAR     *0+             * Point to next bkpnt number
        SAR     AR1,DBNUM LAR     AR1,DBADD
        MAR     *+
        MAR     *+
        MAR     *+              * Point to next address to display
        SAR     AR1,DBADD B       DBAGN           * goto DBAGN DBEND   LRLK    AR1,NEWLIN
        CALL    MESSAG
        LRLK    AR1,NEWLIN
        CALL    MESSAG
$DB     B       MAIN            * Return to MAIN

PEND
        END

IDT     'S120CB'
* 1.8.86

REF     LDASB           * sb module

REF     QURMSG          * cmd module
        REF     NEWLIN          * cmd module
        REF     SPACE6          * cmd module
        REF     SPACE4          * cmd module REF     MESSAG          * i/o module
        REF     GETLIN          * i/o module REF     MAIN            * m module
        REF     COMERR          * m module
        REF     GETWRD          * m module
        REF     INUMBR          * m module
        REF     OUTHEX          * m module

CSEG    'STORE'

TEMP    BSS     1
TEMP1   BSS     1
TEMP2   BSS     1
TEMP3   BSS     1
TEMP4   BSS     1
TEMP5   BSS     1
TEMP6   BSS     1
TEMP7   BSS     1
TEMP8   BSS     1
TEMP9   BSS     1

CEND
```

```
        PSEG

CR      EQU     >0D
LF      EQU     >0A
EOT     EQU     >04

TRUE    EQU     1
HEX     EQU     >10
STRPTR  EQU     AR3
BKNUM   EQU     TEMP3
BKLOC   EQU     TEMP4

DATA    $CB+2           * Next in help menu.
        DATA    $CB+3           * Pointer to code
        B       CB              * Command word length
        DATA    >2              * Command word length
        DATA    'C'             * Command word string (6 chars)
        DATA    'B'
        DATA    ' '
        DATA    ' '
        DATA    ' '
        DATA    ' '
        DATA    'C'
        DATA    'L'
        DATA    'E'
        DATA    'A'
        DATA    'R'
        DATA    ' '
        DATA    'B'
        DATA    'R'
        DATA    'E'
        DATA    'A'
        DATA    'K'
        DATA    'P'
        DATA    'O'
        DATA    'I'
        DATA    'N'
        DATA    'T'
        DATA    ' '
        DATA    ' '
        DATA    ' '
        DATA    ' '
        DATA    EOT
CBMSG   DATA    CR
        DATA    LF
        DATA    'E'
        DATA    'R'
        DATA    'R'
        DATA    'O'
        DATA    'R'
        DATA    ':'
        DATA    ' '
        DATA    'B'
        DATA    'R'
        DATA    'E'
        DATA    'A'
        DATA    'K'
        DATA    'P'
        DATA    'O'
        DATA    'I'
        DATA    'N'
        DATA    'T'
        DATA    ' '
        DATA    'N'
        DATA    'O'
        DATA    'T'
        DATA    ' '
        DATA    'S'
        DATA    'E'
        DATA    'T'
        DATA    EOT
```

```
CBOVF   DATA    CR
        DATA    LF
        DATA    'E'
        DATA    'R'
        DATA    'R'
        DATA    'O'
        DATA    'R'
        DATA    ':'
        DATA    ' '
        DATA    'M'
        DATA    'A'
        DATA    'X'
        DATA    ' '
        DATA    'B'
        DATA    'R'
        DATA    'E'
        DATA    'A'
        DATA    'K'
        DATA    'P'
        DATA    'O'
        DATA    'I'
        DATA    'N'
        DATA    'T'
        DATA    'S'
        DATA    ' '
        DATA    '='
        DATA    ' '
        DATA    '4'
        DATA    CR
        DATA    LF
        DATA    EOT

CB      CALL    GETWRD          * Fetch breakpoint number

LARP    STRPTR          * If word = &CR
        LAR     AR1,*,1         *   Then
        LARK    AR0,CR          *     Goto COMERR
        CMPR    0
        BBNZ    COMERR LARK    AR1,HEX         * Convert ascii
        CALL    INUMBR          * text to hex SAR     AR1,BKNUM       * Save breakpoint number LARP    AR2             * Check for errors
        LARK    AR0,+0
        CMPR    0               * If errors <> 0
        BBZ     COMERR          *   Then goto COMERR LAR     AR2,BKNUM       * If BKNUM = 0
        CMPR    0               *   Then exit via error
        BBNZ    COMERR
        LAR     AR0,>5          * If BKNUM >= 5
        CMPR    1               *   then
        BBZ     CBABS           *     exit via overflow msg
        LRLK    AR1,CBOVF
        CALL    MESSAG CBABS   CALL    GETWRD          * If word <> &CR
        LARP    STRPTR          *   Then
        LAR     AR1,*,1         *     Goto COMERR
        LARK    AR0,CR
        CMPR    0
        BBZ     COMERR LRLK    AR1,LDASB       * Fetch base address of
        LAR     AR0,BKNUM       * breakpoint stack
        MAR     *0+             * Add 3*BKNUM to LDASB
        MAR     *0+
        MAR     *0+
        MAR     *-              * and take away 2
        MAR     *-
```

```
        LAR     AR0,LD
        CMPR    1               * If LDASB + 3*bknum -2 < *LDASB
        BBNZ    CBOK            *   Then goto CBOK (ok!)
        LRLK    AR1,CBMSG       *   Else
        CALL    MESSAG          *     output not set msg
        B       CBEND           *     and exit CBOK    SAR     AR1,BKLOC       * Save pntr
        MAR     *+
        MAR     *+
        MAR     *+              * Point to next address
        LAR     AR2,BKLOC       * AR2 = sink address for stack shift CBNXT   LAR     AR0,LDASB       * See if stack is to be shifted
        CMPR    0
        BBNZ    CBDEC
        LAR     AR0,*+,2        * Shift an address
        SAR     AR0,*+,1
        LAR     AR0,*+,2        * Shift an opcode
        SAR     AR0,*+,1
        LAR     AR0,*+,2        * Shift an opcode
        SAR     AR0,*+,1
        B       CBNXT              then goto CBNXT CBDEC   LAR     AR1,LDASB       * Decrement the breakpoint stack pntr
        MAR     *-              * by three
        MAR     *-
        MAR     *-
        SAR     AR1,LDASB       * and save.

B       CBEND

CBERR   LRLK    AR1,CBMSG
        CALL    MESSAG

CBEND   LRLK    AR1,NEWLIN
        CALL    MESSAG $CB     B       MAIN            * Return to MAIN

PEND
        END
        IDT     'S120RUN'

DEF     RUN
        DEF     RUNSSI
        DEF     RUNMST
        DEF     RUNCMP
        DEF     RUNINC
        DEF     RUNCON
        DEF     RUNEX

* 26.09.86

DEF     RUNSSI          * for ss module
        DEF     RUNUSE          * for m module REF     SAV             * sav module REF     MESSAG          * i/o module REF     LDASB           * sb module REF     LDAMON          * cmd module
        REF     LDAUSR          * cmd module REF     MAIN            * m module
        REF     COMERR          * m module
        REF     GETWRD          * m module
```

```
            CSEG      'STORE'

TEMP        BSS       1
TEMP1       BSS       1
TEMP2       BSS       1
TEMP3       BSS       1
TEMP4       BSS       1
TEMP5       BSS       1
TEMP6       BSS       1
TEMP7       BSS       1
TEMP8       BSS       1
TEMP9       BSS       1
            CEND

PSEG

CR          EQU       >0D
EOT         EQU       >04
STRPTR      EQU       AR3
MARK        EQU       TEMP3           * Used for single step
BKINST      EQU       TEMP5           * Breakpoint instruction
            DATA      $RUN+2
            DATA      $RUN+3          * Next in help menu.
            B         RUN             * Pointer to code
            DATA      >3              * Command word length
            DATA      'R'             * Command word string (6 chars)
            DATA      'U'
            DATA      'N'
            DATA      ' '
            DATA      ' '
            DATA      ' '
            DATA      'R'             * Help menu string (20 chars)
            DATA      'U'
            DATA      'N'
            DATA      ' '
            DATA      'P'
            DATA      'R'
            DATA      'O'
            DATA      'G'
            DATA      'R'
            DATA      'A'
            DATA      'M'
            DATA      ' '
            DATA      'C'
            DATA      'O'
            DATA      'D'
            DATA      'E'
            DATA      ' '
            DATA      ' '
            DATA      ' '
            DATA      EOT RUN         CALL      GETWRD          * If *STRPTR = CR
            LARP      STRPTR          *   Then
            LAR       AR1,*,1         *       Goto COMERR
            LARK      AR0,CR
            CMPR      0
            BBZ       COMERR RUNUSE      LARK      AR1,>0          * MARK = 0
            SAR       AR1,MARK        * SAVE MONITOR REGISTER SET RUNSSI      SAR       AR3,LDAMON      * Save monitor STRPTR
            SAR       AR4,LDAMON+>1   * Save monitor ENDPTR
RUNMST      SST       >60             * Save monitor STATUS 0
            SST1      >61             * Save monitor STATUS 1

LARP      AR1
            LAR       AR1,MARK        * If MARK = 0
            LARK      AR0,>0          *   Then
            CMPR      >0              *       Begin (not using SS module)
            BBZ       RUNCON
```

```
          LARP    AR1             *        Set All Breakpoints
          LAR     AR0,LDASB       *        AR0 = LDASB
          LRLK    AR1,LDASB       *        AR1 = &LDASB
          MAR     *+              *        AR1 = AR1 + 1
RUNCMP    CMPR    0               *        WHILE AR1 <> AR0
          BBNZ    RUNCON          *        Begin
          LAR     AR2,*           *           AR2 = *AR1   ( the bkpnt addr )
          LARP    AR2
          LAR     AR0,LDAUSR+>3   *           AR0 = LDAUSR + >3
          CMPR    0               *           If PC <> bkpnt address
          BBNZ    RUNINC          *           Then
          LARP    AR0             *              If PC <> (bkpnt+1) address
          MAR     *-              *              Begin
          LARP    AR2
          CMPR    0
          BBNZ    RUNINC
          LARP    AR1
          ZALS    *               *                  ACL = *AR1
          LRLK    AR2,>FE80       *                  AR2 = &FE80
          SAR     AR2,BKINST      *                  BKINST = AR2
          TBLW    BKINST          *                  *ACL = BKINST
          ADLK    >1              *                  ACL = ACL + 1
          LRLK    AR2,SAV         *                  AR2 = &SAV
          SAR     AR2,BKINST      *                  BKINST = AR2
          TBLW    BKINST          *                  *ACL = BKINST
RUNINC    LARP    AR1             *              End
          LAR     AR0,LDASB       *           AR0 = LDASB
          MAR     *+              *           AR1 = AR1 + 3
          MAR     *+              *        End
          MAR     *+              *     End
          B       RUNCMP RUNCON    DINT
          LARP    AR4
          LRLK    AR4,LDAUSR      * AR4 = &LDAUSR    (pntr to base of image table)
          LARK    AR2,>4          * AR2 = >4         (data mem address of IMR)

RPTK    3               * For i = 1 TO 4
          PSHD    *+              *    *STACK = *AR4 ; AR4=AR4+1 ; STACK=STACK+1

MAR     *+              * AR4 = AR4 + 1
          LT      *-              * TRG = *AR4          ( first load TRG with PRL)
          MPYK    >1              * AR4 = AR4 - 1
          LT      *+              * PRL = TRG * 1       (load PRL register)
          MAR     *+              * TRG = *AR4 ; AR4=AR4+2  (load TRG register)
          LPH     *+              * PRH = *AR4 ; AR4=AR4+1  (load PRH register)
          ZALS    *+              * ACL = *AR4 ; AR4=AR4+1  (load ACL register)
          ADDH    *+              * ACH = *AR4 ; AR4=AR4+1  (load ACH register)
          LAR     AR0,*+,2        * AR0 = *AR4 ; AR4=AR4+1  (load IMR register)
          SAR     AR0,*,4         * *AR2 = AR0
          LAR     AR0,*+          * AR0 = *AR4 ; AR4=AR4+1  (load AR0 register)
          LAR     AR1,*+          * AR1 = *AR4 ; AR4=AR4+1  (load AR1 register)
          LAR     AR2,*+          * AR2 = *AR4 ; AR4=AR4+1  (load AR2 register)
          LAR     AR3,*+          * AR3 = *AR3 ; AR4=AR4+1  (load AR3 register)
          LAR     AR4,*           * AR4 = *AR4              (load AR4 register)

LDPK    >0

BIT     >62,>6          * If USER INTM = 0
          BBNZ    RUNEX           *    Then
          LST1    >63             *       load status register two
          LST     >62             *       load status register one
          EINT                    *       Enable USER interrupts
          RET                     *       Start the USER programme //
RUNEX     LST1    >63             *    Else
          LST     >62             *       load status register one and two
          DINT                    *       Disable USER interrupts
          RET                     *       Start the USER programme //

FRUN      B       MAIN            * Return to MAIN

PEND
          END
```

```
           IDT      'S120SAV
* 08.8.86
           DEF      SAV
           REF      MESSAG          * i/o module
           REF      LDAIO           * i/o module
           REF      SERINT          * i/o module
           REF      STRTUP          * i/o module REF      DRSSI           * dr module
           REF      LDAMON          * dr module
           REF      LDAUSR          * dr module
           REF      MAIN            * m module
           REF      LDASB           * sb module
           REF      NEWLIN          * cmd module
           CSEG     'STORE'

TEMP       BSS      1
TEMP1      BSS      1
TEMP2      BSS      1
TEMP3      BSS      1
TEMP4      BSS      1
TEMP5      BSS      1
TEMP6      BSS      1
TEMP7      BSS      1
TEMP8      BSS      1
TEMP9      BSS      1
           CEND
           PSEG

MARK       EQU      TEMP3           * SAVE USER VARIABLES      - PAGE 0

SAV        SST      >62             * Save USER status reg 0
           DINT                     * Disable any further USER interrupts
           SST1     >63             * Save USER status reg 1
           LDPK     LDAIO / >80     * SAVE USER VARIABLES      - PAGE 8
SAVARS     SAR      AR4,LDAUSR+>E   * LDAUSR+>E = AR4             (save USER AR4)
           LARP     AR4
           LRLK     AR4,LDAUSR+>D   * AR4 = LDAUSR+>D  (set up image table pntr)
           SAR      AR3,*-          * *AR4 = AR3 ; AR4=AR4-1      (save USER AR3)
           SAR      AR2,*-          * *AR4 = AR2 ; AR4=AR4-1      (save USER AR2)
           SAR      AR1,*-          * *AR4 = AR1 ; AR4=AR4-1      (save USER AR1)
           SAR      AR0,*-,2        * *AR4 = AR0 ; AR4=AR4-1      (save USER AR0)
SAVMRS     LARK     AR2,>4          * AR2 = >4                    (save USER IMR)
           LAR      AR3,*,4         * AR3 = *AR2
           SAR      AR3,*-          * *AR4 = AR3 ; AR4=AR4-1
SAVACC     SACH     *-              * *AR4 = ACH ; AR4=AR4-1      (save USER ACH)
           SACL     *-              * *AR4 = ACL ; AR4=AR4-1      (save USER ACL)
           SPH      0               * No shift on P reg output
           PAC                      * ACC = PREG
           SACH     *-              * *AR4 = ACH ; AR4=AR4-1      (save USER PRH)
           SACL     *-              * *AR4 = ACL ; AR4=AR4-1      (save USER PRL)
           MPYK     >1              * PREG = T*1
           PAC                      * ACC = PREG
           SACL     *-              * *AR4 = ACL ; AR4=AR4-1      (save USER TRG)
SAVSTK     POPD     *-              * LDAUSR+>3 = tmsTOS          (save USER PC)
           POPD     TEMP1           * TEMP1 = tmsTMS
           LARP     AR3
           LAR      AR3,TEMP1
           LRLK     AR0,SAV         * If &SAV=tmsTMS  (interrupt during breakpoint)
           CMPR     0               *   Then
           BBZ      SAVAAA          *     Begin
           LAR      AR1,LDAUSR+>1   *       userBMS = userTMS
           SAR      AR1,LDAUSR
           LAR      AR1,LDAUSR+>2   *       userTMS = userTOS
           SAR      AR1,LDAUSR+>1
           POPD     TEMP1           *       TEMP1 = tmsBMS  (pc bfr bkpnt & int)
           LAR      AR3,TEMP1       *       AR3 = TEMP1
           MAR      *-              *       AR3 = AR3 - 1
           SAR      AR3,LDAUSR+>2   *       userTOS = AR3
           ZALS     LDAUSR+>2       *       ACL = LDAUSR + >2
```

```
          TBLR    TEMP1                  *           AR1 = *AR3
          LARP    AR1                    *        If AR1 <> >CE1E     (If nt trp expt)
          LAR     AR1,TEMP1              *        Then           ( must be a CALL SAV)
          LRLK    AR0,>CE1E              *             AR3 = AR3 - 1 (rtn so dec pc)
          CMPR    0                      *                                   (again)
          BBNZ    SAVMPC                 *             LDAUSR+2 = AR3
          LARP    AR3                    *    ....End
          MAR     *-
          SAR     AR3,LDAUSR+2           *     Else
          B       SAVMPC                 *        Begin
AVAAA     SAR     AR3,LDAUSR+>2          *           userTOS = tmsTMS
          LARP    AR4                    *           (already saved userTOS in LDAUSR+2)
          MAR     *-                     *           userTMS = tmsBMS
          POPD    *-                     *           userBMS = tmsBOS
          POPD    *-                     *        End
AVMPC     LARP    AR3
          LRLK    AR3,LDAUSR+3           * AR3 = LDAUSR+3      (modify USER pc in image
          LAR     AR3,*                  * AR3 = *AR3
          MAR     *-                     * AR3 = AR3 - 1           (USER pc = pc - 1 )
          SAR     AR3,LDAUSR+3           * LDAUSR+3 = AR3
          ZALS    LDAUSR+>3              * ACL = LDAUSR+>3
          TBLR    TEMP1                  * AR1 = *AR3
          LARP    AR1                    * If AR1 <> >CE1E     (If not a trap exception)
          LAR     AR1,TEMP1              *    Then             (then must be a CALL SAV)
          LRLK    AR0,>CE1E              *         AR3 = AR3 - 1 (routine so decrement pc)
          CMPR    0                      *                          (again)
          BBNZ    SAVCON                 *         LDAUSR+3 = AR3
          LARP    AR3
          MAR     *-
          SAR     AR3,LDAUSR+3           * LDAUSR+3 = AR3
AVCON     LDPK    >0                     * LOAD MONITOR VARIABLES    - PAGE 0

LST     >60                    * Load MONITOR status 0 register
          LDPK    0
          LST1    >61                    * Load MONITOR status 1 register

LDPK    LDAIO / >80            * LOAD MONITOR VARAIBLES   - PAGE 8

LAR     AR3,LDAMON             * LOAD SUPERVISOR MONITOR REGISTER SET
          LAR     AR4,LDAMON+>1          * Load MONITOR STRPTR, ENDPTR
          ROVM                           * Disable overflow mode
          RSXM                           * Suppress sign extension
          LARP    AR1                                             . (set MONITOR IMR)
          LARK    AR1,>4                 * AR1 = >4
          LRLK    AR0,>FFC4              * AR0 = >FFC4
          SAR     AR0,*                  * *AR1 = AR0

EINT                           * ENABLE MONITOR INT2 INTERRUPTS!

LRLK    AR1,NEWLIN
          CALL    MESSAG

LARP    AR1                    * If MARK <> 0
          LAR     AR1,MARK               *    Then
          LARK    AR0,>0                 *       BRANCH TO DR MOD (SS bpnt clr by SS mod)
          CMPR    0                      *    Else
          BBZ     DRSSI                  *       Begin LAR     AR0,LDASB              *          Clear all breakpoints
          LRLK    AR1,LDASB              *          AR0 = LDASB
          MAR     *+                     *          AR1 = &LDASB
AVCMP     CMPR    0                      *          AR1 = AR1 + 1
          BBNZ    DRSSI                  *          While AR1 <> AR0
          ZALS    *+                     *             ACC=AR1      : AR1=AR1+1
          TBLH    *+                     *             *ACC = *AR1  : AR1=AR1+1
          ADLK    >1                     *             ACL = ACL + 1
          TBLW    *+                     *             *ACL = *AR1  : AR1=AR1+1
          B       SAVCMP                 *
SAV       B       MAIN                   *       BRANCH TO DR MODULE PEND                           *    End
          END
```

```
        IDT     'S120SS'

DEF     DRSS0
        DEF     SSINT0
        DEF     SSINT1
        DEF     SSINT2
        DEF     SSINT3
        DEF     SSCLIT
        DEF     SSCLB
        DEF     SSNLN

* 25.09.86

************************************************************************
*                                                                      *
*    This module uses modules DIS, SB, RUN, SAV and DR. Branches to the *
* appropriate modules are taken in the sequence listed above with      *
* control always returning eventually to this module. To thread all    *
* the modules together the variable MARK is used. A non-zero value     *
* indicates that the SS module is being used, the actual value of mark *
* signifying further information to allow certain actions to be taken  *
* by the SS module. MARK is always set to zero by each of the above    *
* modules if they are being used separately.                           *
*      If the  RUN command is used on its own MARK is set to zero and all *
* breakpoints in the table are set by the RUN module itself. Then when SAV *
* is executed all breakpoints in the table are cleared by SAV itself. So *
* executing the RUN module causes ALL breakpoints to be set and cleared. *
*      Under the SS module however NO breakpoints in the table are set or *
* cleared by the RUN and SAV modules. Either one or two breakpoints are *
* set and cleared by the SS module alone.  This means that the SS      *
* breakpoints are independent of the RUN breakpoints.                  *
* Information conveyed by MARK:-                                       *
* MARK=0: the SS module is NOT being used.                             *
* MARK=1: a one word instruction is being executed by the SS module - when *
*         SS is first run MARK is set to 1 before calling DIS module - on *
*         return from DIS MARK signifies type of instruction found.    *
* MARK=2: a two word,non-branch instruction is being executed by SS module *
* MARK=3: a two word branch type instruction is being executed by SS module *
* MARK=4: on return from the DIS module this signifies that an illegal *
*         instruction has been found and SS is terminated with the appro- *
*         priate message - otherwise MARK is set to this value later   *
*         temporarily to allow the SS module to clear the second breakpoint *
*         of a branch type instruction                                 *
*                                                                      *
************************************************************************

DEF     DISSS0
        DEF     SBSS0
        DEF     DRSS0

REF     SAV             * sav module

REF     DISSSI          * dis module
        REF     SBSSI           * sb module
        REF     LDASB           * sb module
        REF     RUNSSI          * run module
        REF     MESSAG          * i/o module
        REF     GETLIN          * i/o module REF     MAIN            * m module
        REF     MAIN2           * m module
        REF     COMERR          * m module
        REF     GETWRD          * m module

CSEG    'STORE'

TEMP    BSS     1
```

```
TEMP1    BSS    1
TEMP2    BSS    1
TEMP3    BSS    1
TEMP4    BSS    1
TEMP5    BSS    1
TEMP6    BSS    1
TEMP7    BSS    1
TEMP8    BSS    1
TEMP9    BSS    1

CEND

PSEG

CR       EQU    >0D
LF       EQU    >0A
EOT      EQU    >04

STRPTR   EQU    AR3
BKINST   EQU    TEMP7

DATA   $SS+2          * Next in help menu.
         DATA   $SS+3          * Pointer to code
         B      SS             * Command word length
         DATA   >2             * Command word string (6 chars)
         DATA   'S'
         DATA   'S'
         DATA   ' '
         DATA   ' '
         DATA   ' '
         DATA   ' '
         DATA   'S'
         DATA   'I'
         DATA   'N'
         DATA   'G'
         DATA   'L'
         DATA   'E'
         DATA   ' '
         DATA   'S'
         DATA   'T'
         DATA   'E'
         DATA   'P'
         DATA   ' '
         DATA   ' '
         DATA   ' '
         DATA   ' '
         DATA   ' '
         DATA   ' '
         DATA   ' '
         DATA   ' '
         DATA   EOT
DISMSG   DATA   CR
         DATA   LF
         DATA   'I'
         DATA   'L'
         DATA   'L'
         DATA   'E'
         DATA   'G'
         DATA   'A'
         DATA   'L'
         DATA   ' '
         DATA   'O'
         DATA   'P'
         DATA   'C'
         DATA   'O'
         DATA   'D'
         DATA   'E'
         DATA   ' '
         DATA   'E'
```

```
         DATA     'R'
         DATA     'R'
         DATA     'O'
         DATA     'R'
         DATA     CR
         DATA     LF
         DATA     EOT
DSMG1    DATA     'B'
         DATA     'b'
         DATA     'u'
         DATA     'g'
         DATA     ' '
         DATA     '>'
         DATA     ' '
         DATA     EOT

SS       CALL     GETWRD          * If *STRPTR <> CR
         LARP     STRPTR          *    Then
         LAR      AR1,*,1         *       Goto COMERR
         LARK     AR0,CR
         CMPR     0
         BBZ      COMERR          * REPEAT DISYUP   LARP     AR1             *    Fetch current program counter
         LRLK     AR1,LDAUSR+3    *    stored in image
         LAR      AR1,*
         SAR      AR1,TEMP5       *    temp5 = ADRESS in DIS module
DISEIN   LARK     AR1,>1          *          = current program counter value
         SAR      AR1,TEMP3       *    temp3 = 1 = MARK in DIS module
         SAR      AR1,TEMP8       *    temp8 = ONEN in DIS module
         B        DISSSI          *    BRANCH TO DIS MODULE DISSSO   LARP     AR1             *    AR1 = TEMP3
         LAR      AR1,TEMP3       *    If MARK = 4
         LARK     AR0,>4          *       Then
         CMPR     0
         BBZ      DISPAS          *
         LRLK     AR1,DISMSG      *          illegal instruction
         CALL     MESSAG          *          MESSAG
         B        MAIN            *          GOTO MAIN DISPAS   LARP     AR1             *    TEMP5 now = addr. S to place bkpnt
         LAR      AR1,TEMP5       *    Point to instruction before breakpoint
         MAR      *-              *    AR1 = AR1 - 1
         SAR      AR1,TEMP4       *    ACC = AR1      (address before breakpoint)
         ZALS     TEMP4           *    AR1 = *ACL     (fetch instruction)
         TBLR     TEMP4
         LAR      AR1,TEMP4

LRLK     AR0,>CE00       *    If *ACL = &CE00    (an EINT instruction)
         CMPR     0               *       Then
         BBZ      DISPA2          *          Branch back to run dis module etc
         B        DISEIN          *          again. (EINT allows instruction
         NOP                      *          following it to execute before en)

DISPA2   LRLK     AR0,>CE24       *    If *ACC = &CE24    ( a CALA instruction)
         CMPR     0               *       Then
         BBZ      DISPA3          *          Change bkpnt addr to ACC value
         LAR      AR1,LDAUSR+>7   *          AR1 = LDAUSR+>7   (USER acl value)
         SAR      AR1,TEMP5       *          TEMP5 = AR1

DISPA3   LRLK     AR0,>CE26       *    If *ACC = &RET     (a RET instruction)
         CMPR     0               *       Then
         BBZ      DISPA4          *          Change bkpnt addr to TOS value
         LAR      AR1,LDAUSR+>2   *          AR1 = LDAUSR+>2   (USER tos value)
         SAR      AR1,TEMP5       *          TEMP5 = AR1

DISPA4   LAR      AR1,TEMP5
```

```
SSONE    SAR     AR1,TEMP4       *       TEMP4 = TEMP5 = ADRR in SB module
         B       SBSSI           *       BRANCH TO SB MODULE SBSSO    LARP    AR2             *       If (PC<>2 and PC<>4) or MARK = 4
         LAR     AR2,LDAUSR+>3   *          Then
         LARK    AR0,>2          *             Begin
         CMPR    0
         BBNZ    SSMARK          *              ( Dont want to set a breakpoint
         LARK    AR0,>4          *                just after the branch instruction
         CMPR    0               *                for interrupt 0 or 1 in program
         BBZ     SSSET           *                memory - otherwise int1 would SSMARK   LAR     AR2,TEMP3       *                overwrite int2 vector which is
         LARK    AR0,>4          *                used by the monitor )
         CMPR    0
         BBZ     SSSKP SSSET    LARP    AR1             *       SET BREAKPOINTS IN PROGRAM MEMORY
         LAR     AR1,LDASB       *          AR1 = LDASB
         MAR     *-              *          AR1 = AR1 - 3
         MAR     *-              *          ACC=*AR1  (the address to set bkpnt)
         MAR     *-
         ZALS    *               *          BKINST = >FE80 (first word of bkpnt)
         LRLK    AR2,>FE80       *          *ACC = BKINST
         SAR     AR2,BKINST
         TBLW    BKINST          *          ACL = ACL + 1 (second word of bkpnt)
         ADLK    >1              *          BKINST = &SAV
         LRLK    AR2,SAV         *          *ACC = BKINST
         SAR     AR2,BKINST      *       End
         TBLW    BKINST SSSKP    LARP    AR2             *       If MARK = 3
         LAR     AR2,TEMP3       *          Then
         LARK    AR0,>3          *             Begin
         CMPR    0               *                Branch type instruction
         BBZ     SSUSR           *                TEMP4 = TEMP4 - 1
         LARP    AR1             *                ACC = TEMP4
         LAR     AR1,TEMP4       *                TEMP4 = *TEMP4
         MAR     *-              *                MARK = 4
         SAR     AR1,TEMP4       *                BRANCH TO SB MODULE
         ZALS    TEMP4           *                Goto SBSSO (returns at SBSSO)
         TBLR    TEMP4           *             End
         LARK    AR1,>4
         SAR     AR1,TEMP3
         B       SBSSI SSUSR    LACK    >3              *       SAVE ALL USER INTERRUPT ADDRESSES
         TBLR    LDAINT
         LACK    >5
         TBLR    LDAINT+>1
         LACK    >19
         TBLR    LDAINT+>2
         LACK    >1F
         TBLR    LDAINT+>3

SSBK1    LARP    AR2             *       PUT BREAKPOINT AT USER INTERRUPTS
         LRLK    AR1,>FE80
         SAR     AR1,BKINST      *       BKINST = &FE80
         LRLK    AR1,SAV         *       TEMP6 = &SAV
         SAR     AR1,TEMP6
         LAR     AR2,LDAUSR+>3   *       AR2 = PC

LARK    AR0,>2          *       If PC <> &2
         CMPR    0               *          Then
         BBNZ    SSBK2           *             Begin
         LACK    >2              *                ACL = &2 : *ACL = BKINST
         TBLW    BKINST          *                ACL = &3 : *ACL = TEMP6
         LACK    >3              *             End
         TBLW    TEMP6
```

```
SSBK2    LARK    AR0,>4        *    If PC <> &4
         CMPR    0             *    Then
         BBNZ    SSBK3         *        Begin
         LACK    >4            *            ACL = &4 ; *ACL = BKINST
         TBLW    BKINST        *            ACL = &5 ; *ACL = TEMP6
         LACK    >5            *        End
         TBLW    TEMP6

SSBK3    LARK    AR0,>18       *    If PC <> &18
         CMPR    0             *    Then
         BBNZ    SSBK4         *        Begin
         LACK    >18           *            ACL = &18 ; *ACL = BKINST
         TBLW    BKINST        *            ACL = &19 ; *ACL = TEMP6
         LACK    >19           *        End
         TBLW    TEMP6

SSBK4    LARK    AR0,>1E       *    If PC <> &1E
         CMPR    0             *    Then
         BBNZ    SSRUN         *        Begin
         LACK    >1E           *            ACL = &1E ; *ACL = BKINST
         TBLW    BKINST        *            ACL = &1F ; *ACL = TEMP6
         LACK    >1F           *        End
         TBLW    TEMP6

SSRUN    B       RUNSSI        *    BRANCH TO RUN MODULE

DRSS0    LARP    AR2           *    CHECK FOR CHANGED INTERRUPT ADDRESSES
         LRLK    AR2,>FE80     *    AR2 = &FE80
         LRLK    AR1,SAV       *    AR1 = &SAV

SSINT0   LACK    >2
         TBLR    TEMP6         *    ACL = &2
         LAR     AR0,TEMP6     *    AR0 = *ACL
         CMPR    0             *    If *ACL = &FE80
         BBZ     SSINT1        *    Then
         LACK    >3            *        Begin
         TBLR    TEMP6         *            ACL = &3
         LARP    AR1           *            TEMP6 = *ACL
         LAR     AR0,TEMP6     *            AR0 = TEMP6
         CMPR    0             *            If &SAV <> *ACL
         BBNZ    SSINT1        *                Then
         SAR     AR0,LDAINT    *                    LDAINT = *ACL
SSINT1   LARP    AR2           *        End LACK    >4
         TBLR    TEMP6         *    ACL = &4
         LAR     AR0,TEMP6     *    AR0 = *ACL
         CMPR    0             *    If *ACL = &FE80
         BBZ     SSINT2        *    Then
         LACK    >5            *        Begin
         TBLR    TEMP6         *            ACL = &5
         LARP    AR1           *            TEMP6 = *ACL
         LAR     AR0,TEMP6     *            AR0 = TEMP6
         CMPR    0             *            If &SAV <> *ACL
         BBNZ    SSINT2        *                Then
         SAR     AR0,LDAINT+1  *                    LDAINT+1 = *ACL
SSINT2   LARP    AR2           *        End
         LACK    >18
         TBLR    TEMP6         *    ACL = &18
         LAR     AR0,TEMP6     *    AR0 = *ACL
         CMPR    0             *    If *ACL = &FE80
         BBZ     SSINT3        *    Then
         LACK    >19           *        Begin
         TBLR    TEMP6         *            ACL = &19
         LARP    AR1           *            TEMP6 = *ACL
         LAR     AR0,TEMP6     *            AR0 = TEMP6
         CMPR    0             *            If &SAV <> *ACL
         BBNZ    SSINT3        *                Then
```

```
         SAR    AR0,LDAINT+>2    *              LDAINT+>2 = *ACL
SSINT3   LARP   AR2              *           End

LACK   >1E
         TBLR   TEMP6            *           ACL = &1E
         LAR    AR0,TEMP6        *           AR0 = *ACL
         CMPR   0                *           If *ACL = &FE80
         BBZ    SSCLIT           *           Then
         LACK   >1F              *             Begin
         TBLR   TEMP6            *               ACL = &3
         LARP   AR1              *               TEMP6 = *ACL
         LAR    AR0,TEMP6        *               AR0 = TEMP6
         CMPR   0                *               If &SAV <> *ACL
         BBNZ   SSCLIT           *               Then
         SAR    AR0,LDAINT+>3    *                 LDAINT+>3 = *ACL
         LARP   AR2              *           End SSCLIT   LRLK   AR2,>FF80        *   CLEAR ALL USER INTERRUPTS
         SAR    AR2,BKINST       *   BKINST = &FF80     (branch instruction)
         LACK   >2
         TBLW   BKINST
         LACK   >3
         TBLW   LDAINT
         LACK   >4
         TBLW   BKINST
         LACK   >5
         TBLW   LDAINT+>1
         LACK   >18
         TBLW   BKINST
         LACK   >19
         TBLW   LDAINT+>2
         LACK   >1E
         TBLW   BKINST
         LACK   >1F
         TBLW   LDAINT+>3

SSCLB    LARP   AR1
         LAR    AR1,LDASB        *   Clear a Breakpoint
         MAR    *-               *   AR1 = LDASB
         MAR    *-               *   AR1 = AR1 - 3
         MAR    *-
         SAR    AR1,LDASB        *   LDASB = AR1
         ZALS   *+               *   ACC = *AR1        (program memory address)
         TBLW   *+               *   AR1 = AR1 + 1     (1st USER inst put back)
         ADLK   >1               *   ACL = ACL + 1     (2nd USER inst put back)
         TBLW   *                *   ACC = *AR1
         LAR    AR1,TEMP3        *   If MARK = 4
         LARK   AR0,>4           *   Then
         CMPR   0                *     Begin
         BBZ    SSNLN            *       MARK = 3
         LARK   AR0,>3           *       Goto SSCLB
         SAR    AR0,TEMP3        *     End
         B      SSCLB SSNLN    LRLK   AR1,SSMG1        *   Output Dummy Prompt
         CALL   MESSAG
         CALL   GETLIN
         CALL   GETWRD           *   Fetch next keyboard input
         LARP   STRPTR
         LAR    AR1,*,1          * UNTIL ( *STRPTR <> CR )
         LARK   AR0,CR
         CMPR   0
         BBNZ   DISYUP $SS      B      MAIN2            * RETURN to MAIN2

PEND
         END
```

```
         IDT      'S120DR'

* 23.7.86

DEF      DRSSI
         REF      DRSSO         * ss module

REF      MESSAG        * i/o module
         REF      GETLIN        * i/o module REF      LDAUSR        * cmd module
         REF      NEWLIN        * cmd module
         REF      SPACES        * cmd module
         REF      SPACE4        * cmd module REF      MAIN          * m module
         REF      COMERR        * m module
         REF      GETWRD        * m module
         REF      INUMBR        * m module
         REF      OUTHEX        * m module

CSEG     'STORE'

TEMP     BSS      1
TEMP1    BSS      1
TEMP2    BSS      1
TEMP3    BSS      1
TEMP4    BSS      1
TEMP5    BSS      1
TEMP6    BSS      1
TEMP7    BSS      1
TEMP8    BSS      1
TEMP9    BSS      1

CEND

PSEG

CR       EQU      >0D
LF       EQU      >0A
EOT      EQU      >04

STRPTR   EQU      AR3
MARK     EQU      TEMP3

DATA     $DR+2
         DATA     $DR+3         * Next in help menu.
         B        DR            * Pointer to code
         DATA     >2            * Command word length
         DATA     'D'           * Command word string (6 chars)
         DATA     'R'
         DATA     ' '
         DATA     ' '
         DATA     ' '
         DATA     ' '
         DATA     'D'           * Help menu string (20 chars)
         DATA     'I'
         DATA     'S'
         DATA     'P'
         DATA     'L'
         DATA     'A'
         DATA     'Y'
         DATA     ' '
         DATA     'R'
         DATA     'E'
         DATA     'G'
         DATA     'I'
         DATA     'S'
         DATA     'T'
         DATA     'E'
```

```
        DATA    'R'
        DATA    'S'
        DATA    ' '
        DATA    ' '
        DATA    CR
        DATA    LF
        DATA    EOT
DRAR0   DATA    'A'
        DATA    'R'
        DATA    '0'
        DATA    ' '
        DATA    '='
        DATA    ' '
        DATA    EOT

DRAR1   DATA    'A'
        DATA    'R'
        DATA    '1'
        DATA    ' '
        DATA    '='
        DATA    ' '
        DATA    EOT

DRAR2   DATA    'A'
        DATA    'R'
        DATA    '2'
        DATA    ' '
        DATA    '='
        DATA    ' '
        DATA    EOT

DRAR3   DATA    'A'
        DATA    'R'
        DATA    '3'
        DATA    ' '
        DATA    '='
        DATA    ' '
        DATA    EOT

DRAR4   DATA    'A'
        DATA    'R'
        DATA    '4'
        DATA    ' '
        DATA    '='
        DATA    ' '
        DATA    EOT
DRST0   DATA    'S'
        DATA    'T'
        DATA    '0'
        DATA    ' '
        DATA    '='
        DATA    ' '
        DATA    EOT

DRST1   DATA    'S'
        DATA    'T'
        DATA    '1'
        DATA    ' '
        DATA    '='
        DATA    ' '
        DATA    EOT

DRACH   DATA    'A'
        DATA    'C'
        DATA    'H'
        DATA    ' '
        DATA    '='
        DATA    ' '
        DATA    EOT
```

```
DRACL   DATA    'A'
        DATA    'C'
        DATA    'L'
        DATA    ' '
        DATA    '='
        DATA    ' '
        DATA    EOT

DRPRL   DATA    'P'
        DATA    'R'
        DATA    'L'
        DATA    ' '
        DATA    '='
        DATA    ' '
        DATA    EOT

DRPRH   DATA    'P'
        DATA    'R'
        DATA    'H'
        DATA    ' '
        DATA    '='
        DATA    ' '
        DATA    EOT

DRTRG   DATA    'T'
        DATA    'R'
        DATA    'G'
        DATA    ' '
        DATA    '='
        DATA    ' '
        DATA    EOT

DRPC    DATA    'P'
        DATA    'C'
        DATA    ' '
        DATA    ' '
        DATA    '='
        DATA    ' '
        DATA    EOT

DRTOS   DATA    'T'
        DATA    'O'
        DATA    'S'
        DATA    ' '
        DATA    '='
        DATA    ' '
        DATA    EOT

DRTMS   DATA    'T'
        DATA    'M'
        DATA    'S'
        DATA    ' '
        DATA    '='
        DATA    ' '
        DATA    EOT

DRBMS   DATA    'B'
        DATA    'M'
        DATA    'S'
        DATA    ' '
        DATA    '='
        DATA    ' '
        DATA    EOT

DRGRG   DATA    'G'
        DATA    'R'
        DATA    'G'
        DATA    ' '
        DATA    '='
        DATA    ' '
        DATA    EOT
```

```
DRIMR    DATA     'I'
         DATA     'M'
         DATA     'R'
         DATA     ' '
         DATA     '='
         DATA     ' '
         DATA     EOT

DRPRD    DATA     'P'
         DATA     'R'
         DATA     'D'
         DATA     ' '
         DATA     '='
         DATA     ' '
         DATA     EOT

DRTIM    DATA     'T'
         DATA     'I'
         DATA     'M'
         DATA     ' '
         DATA     '='
         DATA     ' '
         DATA     EOT

DRDXR    DATA     'D'
         DATA     'X'
         DATA     'R'
         DATA     ' '
         DATA     '='
         DATA     ' '
         DATA     EOT

DRDRR    DATA     'D'
         DATA     'R'
         DATA     'R'
         DATA     ' '
         DATA     '='
         DATA     ' '
         DATA     EOT

DR       CALL     GETWRD        * Check command is ok
         LARP     STRPTR        * If *STRPTR <> CR
         LAR      AR1,*,1       *    Then
         LARK     AR0,CR        *        Goto COMERR
         CMPR     0
         BBZ      COMERR LARK     AR2,>0        * MARK = 0
         SAR      AR2,MARK      * (not using SS module)

LRLK     AR1,NEWLIN    * EnTrY PoInT fOr SS MoDuLe
         CALL     MESSAG
DRSSI    LRLK     AR1,NEWLIN    * Use AR4 for indirect addressing of page 0
         CALL     MESSAG SAR      AR4,TEMP7     * Save current value of AR4

DRSTK    LRLK     AR1,DRBMS     * Stack middle bottom BMOS
         CALL     MESSAG
         LAR      AR1,LDAUSR
         LARK     AR2,4
         CALL     OUTHEX LRLK     AR1,SPACE6    * stack middle top TMOS
         CALL     MESSAG
         LRLK     AR1,DRTMS
         CALL     MESSAG
         LAR      AR1,LDAUSR+>1
         LARK     AR2,4
         CALL     OUTHEX
```

```
        LRLK    AR1,SPACE6       * stack top TOS
        CALL    MESSAG
        LRLK    AR1,DRTOS
        CALL    MESSAG
        LAR     AR1,LDAUSR+>2
        LARK    AR2,4
        CALL    OUTHEX LRLK    AR1,SPACE6
        CALL    MESSAG
        LRLK    AR1,DRTRG        * Display T REGISTER
        CALL    MESSAG
        LAR     AR1,LDAUSR+>4
        LARK    AR2,4
        CALL    OUTHEX LRLK    AR1,SPACE6       * program counter
        CALL    MESSAG
        LRLK    AR1,DRPC
        CALL    MESSAG
        LAR     AR1,LDAUSR+>3
        LARK    AR2,4
        CALL    OUTHEX

LRLK    AR1,NEWLIN
        CALL    MESSAG

LRLK    AR1,DRPRH        * Display P REGISTER high
        CALL    MESSAG
        LAR     AR1,LDAUSR+>6
        LARK    AR2,4
        CALL    OUTHEX LRLK    AR1,SPACE6       * Display P REGISTER low
        CALL    MESSAG
        LRLK    AR1,DRPRL
        CALL    MESSAG
        LAR     AR1,LDAUSR+>5
        LARK    AR2,4
        CALL    OUTHEX LRLK    AR1,SPACE6       * Display ACCUMULATOR high
        CALL    MESSAG
        LRLK    AR1,DRACH
        CALL    MESSAG
        LAR     AR1,LDAUSR+>8
        LARK    AR2,4
        CALL    OUTHEX LRLK    AR1,SPACE6       * Display ACCUMULATOR low
        CALL    MESSAG
        LRLK    AR1,DRACL
        CALL    MESSAG
        LAR     AR1,LDAUSR+>7
        LARK    AR2,4
        CALL    OUTHEX

LRLK    AR1,NEWLIN
        CALL    MESSAG

DRARS   LRLK    AR1,DRAR0        * Display AR0
        CALL    MESSAG
        LAR     AR1,LDAUSR+>A
        LARK    AR2,4
        CALL    OUTHEX LRLK    AR1,SPACE6       * Display AR1
        CALL    MESSAG
        LRLK    AR1,DRAR1
        CALL    MESSAG
        LAR     AR1,LDAUSR+>B
        LARK    AR2,4
        CALL    OUTHEX
```

```
        LRLK    AR1,SPACE6      * Display AR2
        CALL    MESSAG
        LRLK    AR1,DRAR2
        CALL    MESSAG
        LAR     AR1,LDAUSR+>C
        LARK    AR2,4
        CALL    OUTHEX LRLK    AR1,SPACE6      * Display AR3
        CALL    MESSAG
        LRLK    AR1,DRAR3
        CALL    MESSAG
        LAR     AR1,LDAUSR+>D
        LARK    AR2,4
        CALL    OUTHEX LRLK    AR1,SPACE6      * Display AR4
        CALL    MESSAG
        LRLK    AR1,DRAR4
        CALL    MESSAG
        LAR     AR1,LDAUSR+>E
        LARK    AR2,4
        CALL    OUTHEX

LRLK    AR1,NEWLIN
        CALL    MESSAG

DRMRS   LRLK    AR1,DRDRR       * Display memory Registers
        CALL    MESSAG          * DRR register
        LARP    AR4
        LARK    AR4,>0
        LAR     AR1,*+
        LARK    AR2,4
        CALL    OUTHEX LRLK    AR1,SPACE6      * DXR register
        CALL    MESSAG
        LRLK    AR1,DRDXR
        CALL    MESSAG
        LARP    AR4
        LAR     AR1,*+
        LARK    AR2,4
        CALL    OUTHEX LRLK    AR1,SPACE6
        CALL    MESSAG
        LRLK    AR1,DRTIM       * TIM register
        CALL    MESSAG
        LARP    AR4
        LAR     AR1,*+
        LARK    AR2,4
        CALL    OUTHEX LRLK    AR1,SPACE6      * PRD register
        CALL    MESSAG
        LRLK    AR1,DRPRD
        CALL    MESSAG
        LARP    AR4
        LAR     AR1,*+
        LARK    AR2,4
        CALL    OUTHEX
        LRLK    AR1,SPACE6      * GREG register
        CALL    MESSAG
        LRLK    AR1,DRGRG
        CALL    MESSAG
        LARP    AR4
        MAR     *+
        LAR     AR1,*+
        LARK    AR2,4
        CALL    OUTHEX

LRLK    AR1,NEWLIN
        CALL    MESSAG
```

```
DRSTS   LRLK    AR1,DRST0       * Display user STATUS 0
        CALL    MESSAG
        LARP    AR4
        LRLK    AR4,>62
        LAR     AR1,*
        LARK    AR2,4
        CALL    OUTHEX LRLK    AR1,SPACE6      * Display user STATUS 1
        CALL    MESSAG
        LRLK    AR1,DRST1
        CALL    MESSAG
        LARP    AR4
        LRLK    AR4,>63
        LAR     AR1,*
        LARK    AR2,4
        CALL    OUTHEX LRLK    AR1,SPACE6      * IMR register
        CALL    MESSAG
        LRLK    AR1,DRIMR
        CALL    MESSAG
        LAR     AR1,LDAUSR+>9
        LARK    AR2,4
        CALL    OUTHEX LAR     AR4,TEMP7       * Restore original AR4 value
DREND   LRLK    AR1,NEWLIN
        CALL    MESSAG
        LRLK    AR1,NEWLIN
        CALL    MESSAG LARP    AR1             * If MARK = 0
        LAR     AR1,MARK        *    Then
        LARK    AR0,>0          *       Goto MAIN
        CMPR    0               *    Else
        BBZ     DRSS0           *       BRANCH TO SS MODULE
$DR     B       MAIN

PEND
        END
        IDT     'S120DIS'

* 8.6.86
```

```
***********************************************************************
*                                                                     *
* Module to disassemble code in program memory from a specified start *
* address and number of memory locations. The variable flag is used   *
* to indicate type of instruction being decoded:                      *
* FLAG=0: a one word instruction.                                     *
* FLAG=1: a two word, non-branch instruction.                         *
* FLAG=2: a two word branch type instruction.                         *
* FLAG=3: an illegal opcode detected.                                 *
*                                                                     *
***********************************************************************

REF     MESSAG          * i/o module

DEF     DISSS1          * ss module
        REF     DISSS0          * sb module

REF     NEWLIN          * cmd module
        REF     SPACE4          * cmd module REF     MAIN            * m module
        REF     COMERR          * m module
        REF     GETWRD          * m module
        REF     INUMBR          * m module
        REF     OUTHEX          * m module
```

```
        CSEG    'STORE'

TEMP    BSS     1
TEMP1   BSS     1
TEMP2   BSS     1
TEMP3   BSS     1
TEMP4   BSS     1
TEMP5   BSS     1
TEMP6   BSS     1
TEMP7   BSS     1
TEMP8   BSS     1
TEMP9   BSS     1

CEND

PSEG

CR      EQU     >0D
LF      EQU     >0A
EOT     EQU     >04

HEX     EQU     >10
 TRPTR  EQU     AR3
 ARK    EQU     TEMP3           * if MARK <> 0 then SS module being used
 LAG    EQU     TEMP4           * FLAG = 0, 1, 2, 3
ADRESS  EQU     TEMP5
ENDADR  EQU     TEMP6
OPCODE  EQU     TEMP7
ONEN    EQU     TEMP8           * One nibble
TWON    EQU     TEMP9           * Two nibble
        DATA    $DIS+2
        DATA    $DIS+3          * Next in help menu
        B       DIS             * Pointer to code
        DATA    >3              * Command word length
        DATA    'D'             * Command word string (6 chars)
        DATA    'I'
        DATA    'S'
        DATA    ' '
        DATA    ' '
        DATA    ' '
        DATA    'D'             * Help menu string (20 chars)
        DATA    'I'
        DATA    'S'
        DATA    'A'
        DATA    'S'
        DATA    'S'
        DATA    'E'
        DATA    'M'
        DATA    'B'
        DATA    'L'
        DATA    'E'
        DATA    ' '
        DATA    'C'
        DATA    'O'
        DATA    'D'
        DATA    'E'
        DATA    ' '
        DATA    ' '
        DATA    ' '
        DATA    CR
        DATA    LF
        DATA    EOT
BONE    DATA    'A'             * instruction 1
        DATA    'D'
        DATA    'D'
        DATA    ' '
        DATA    'S'             *  2
```

```
        DATA    'U'
        DATA    'B'
        DATA    ' '
        DATA    'L'
        DATA    'A'             *   3
        DATA    'C'
        DATA    ' '
        DATA    'L'             *   4
        DATA    'A'
        DATA    'R'
        DATA    ' '
        DATA    'M'
        DATA    'P'             *   5
        DATA    'Y'
        DATA    ' '
*               etc,etc
*                   .                   NOTE: Instructions 6 to 112 of the TMS32020
*                   .                         instruction set are placed here. They
*                   .                         have been deleted in this particular
*                   .                         printout only to save printout paper.
*                   .
        DATA    'C'             *113
        DATA    'A'
        DATA    'L'
        DATA    'L'
        DATA    'B'             *114
        DATA    ' '
        DATA    ' '
        DATA    ' '
        DATA    EOT DIS     CALL    GETWRD          * Fetch address LARP    STRPTR          * If word = CR
        LAR     AR1,*,1
        LARK    AR0,CR          *   then
        CMPR    0
        BBNZ    COMERR          *     goto COMERR LARK    AR1,HEX         * Convert ascii
        CALL    INUMBR          * text to hex SAR     AR1,ADRESS      * Save address LARP    AR2             * Check for errors
        LARK    AR0,+0
        CMPR    0               * If errors /= 0
        BBZ     COMERR          *   then goto COMERR DISABS  CALL    GETWRD          * Fetch onen
        LARK    AR1,HEX         * Convert ascii
        CALL    INUMBR          * text to hex LARP    AR2
        LARK    AR0,+0
        CMPR    0               * If errors /= 0
        BBZ     COMERR          *   then goto COMERR SAR     AR1,ONEN        * Save num to fill DISCON  CALL    GETWRD          * Check end of command LARP    STRPTR          * If word /= CR
        LAR     AR1,*,1
        LARK    AR0,CR          *   then
        CMPR    0
        BBZ     COMERR          *     goto COMERR
```

```
        LARK    AR2,>0          * Clear MARK (if here then not using SS module)
        SAR     AR2,MARK        * MARK = 0

DISSSI  LARP    AR1             * EnTrY pOiNt FoR SS mOdUlE
        LAR     AR1,ADRESS
        LAR     AR0,ONEN        * Calculate end address
        MAR     *0+             * ENDADR = ADRESS + ONEN - 1
        MAR     *-
        SAR     AR1,ENDADR
        LAR     AR0,ADRESS      * If ENDADR < ADRESS
        CMPR    1               *   Then
        BBNZ    COMERR          *     EXIT via ERROR

DISNAD  LRLK    AR1,NEWLIN
        CALL    MESSAG

LARK    AR2,>0          * Clear flag
        SAR     AR2,FLAG        * FLAG = 0

LAR     AR1,ADRESS      * Output the address
        LARK    AR2,+5          * AR1 = ADRESS
        CALL    OUTHEX          * OUTHEX

LRLK    AR1,SPACE4      * OUTPUT 4 SPACES
        CALL    MESSAG

ZALS    ADRESS          * Fetch opcode from prog mem
        TBLR    OPCODE          * ACL = ADRESS ; OPCODE = *ACL LAR     AR1,OPCODE      * Output opcode
        LARK    AR2,+6          * AR1 = OPCODE
        CALL    OUTHEX          * OUTHEX

LRLK    AR1,SPACE4      * OUTPUT 4 SPACES
        CALL    MESSAG

LAC     OPCODE,4        * Save MS nibble
        SACH    ONEN
        LAC     OPCODE,8        * Save two MS nibbles
        SACH    TWON LARP    AR1             * TEST FOR ILLEGAL OPCODE
        LAR     AR1,TWON
        LARK    AR0,>3A
        CMPR    0
        BBNZ    DISMMM
        LARK    AR0,>3B
        CMPR    0
        BBNZ    DISMMM
        LARK    AR0,>43
        CMPR    0
        BBNZ    DISMMM
        LARK    AR0,>4F
        CMPR    0
        BBNZ    DISMMM
        LARK    AR0,>5E
        CMPR    0
        BBNZ    DISMMM
        LARK    AR0,>5F
        CMPR    0
        BBNZ    DISMMM
        LARK    AR0,>7B
        CMPR    0
        BBNZ    DISMMM
        LARK    AR0,>7C
        CMPR    0
        BBNZ    DISMMM
        LARK    AR0,>7D
        CMPR    0
        BBNZ    DISMMM
        LARK    AR0,>7E
```

```
        CMPR    0
        BBNZ    DISMMM
        LARK    AR0,>7F
        CMPR    0
        BBNZ    DISMMM
        LARK    AR0,>CC
        CMPR    0
        BBNZ    DISMMM
        LARK    AR0,>CD
        CMPR    0
        BBNZ    DISMMM
        LARK    AR0,>CF
        CMPR    0
        BBNZ    DISMMM
        LARK    AR0,>CE
        CMPR    0
        BBZ     DISDDD
        LAR     AR1,OPCODE      * Test for illegal opcodes starting with >CE
        LRLK    AR0,>CE28
        CMPR    1
        BBZ     DISCCC
        LRLK    AR0,>CE10
        CMPR    0
        BBNZ    DISMMM
        LRLK    AR0,>CE11
        CMPR    0
        BBNZ    DISMMM
        LRLK    AR0,>CE12
        CMPR    0
        BBNZ    DISMMM
        LRLK    AR0,>CE13
        CMPR    0
        BBNZ    DISMMM
        LRLK    AR0,>CE17
        CMPR    0
        BBNZ    DISMMM
        LRLK    AR0,>CE1A
        CMPR    0
        BBNZ    DISMMM
        LRLK    AR0,>CE22
        CMPR    0
        BBNZ    DISMMM
        B       DISONE
DISCCC  LRLK    AR0,>CE50
        CMPR    0
        BBNZ    DISONE
        LRLK    AR0,>CE51
        BBNZ    DISONE
        LRLK    AR0,>CE52
        BBNZ    DISONE
        LRLK    AR0,>CE53
        BBNZ    DISONE
        LRLK    AR0,>CEA2
        BBNZ    DISONE
        B       DISMMM
DISDDD  LAR     AR1,ONEN
        LARK    AR0,>D
        CMPR    0
        BBZ     DISONE
        ZALS    OPCODE          * If MSN = >D
        ANDK    >F              *   Then
        SBLK    >6              *     If LSN > 6
        BGZ     DISMMM          *       Then Goto DISMMM B       DISONE          * OK! OPCODE is NOT illegal!

DISMMM  LARP    AR1             * ILLEGAL OPCODE DETECTED
        LAR     AR1,MARK
        LARK    AR0,>0
        CMPR    0
        BBNZ    DISFAL
```

```
         LARK    AR1,>4           * MARK = 4
         SAR     AR1,MARK         * Goto DISSSO
         B       DISSSO DISONE   LARP    AR1              * FIND PNTR TO MNEMONIC AND FLAG
         LAR     AR1,TWON
         LARK    AR0,>30          * Test if ADD,SUB,LAC
         CMPR    1
         BBZ     DISTWO
         LAC     ONEN,2
         B       DISMNE DISTWO   LARK    AR0,>38          * Test if LAR
         CMPR    1
         BBZ     DISTHR
         LALK    >C
         B       DISMNE DISTHR   LARK    AR0,>60          * Test if MPY to MAC
         CMPR    1
         BBZ     DISFOR
         LAC     TWON             * Find pntr to mnemonic
         SBLK    >38
         SFL                      * Multiply by 4
         SFL
         ADLK    >10
         LARP    AR2
         LRLK    AR2,>5500        * Test if NOP
         LAR     AR0,OPCODE
         CMPR    0
         BBZ     DISTH1,*,1
         LALK    >18
         B       DISMNE
DISTH1   LARK    AR0,>5C          * Test if MAC or MACD
         CMPR    1                * two word instructions
         BBNZ    DISMNE
         LARK    AR2,>1           * Two word instruction so
         SAR     AR2,FLAG         * set the amazing flag
         B       DISMNE DISFOR   LARK    AR0,>70          * Test if SACL or SACH
         CMPR    1
         BBZ     DISFIV
         LACK    >A8              * Assume SACL
         BIT     OPCODE,4         * test bit B
         BBZ     DISMNE
         LACK    >AC              * It's actually SACH
         B       DISMNE DISFIV   LARK    AR0,>78          * Test if SAR
         CMPR    1
         BBZ     DISSIX
         LALK    >B0              * inst no 45
         B       DISMNE DISSIX   LARK    AR0,>7B          * Test if SST,SST1,POPD
         CMPR    1                * inst no 46,47,48
         BBZ     DISEGT
         LAC     TWON
         SBLK    >78
         SFL
         SFL
         ADLK    >B4
         B       DISMNE DISEGT   LARK    AR0,>90          * Test if IN
         CMPR    1                * inst no 49
         BBZ     DISNIN
         LALK    >C0
         B       DISMNE
```

```
DISNIN   LARK    AR0,>A0      * Test if BIT
         CMPR    1            * inst no 50
         BBZ     DISTEN
         LALK    >C4
         B       DISMNE DISTEN   LARK    AR0,>C0      * Test if MPYK
         CMPR    1            * inst no 51
         BBZ     DISELE
         LALK    >C8
         B       DISMNE DISELE   LARK    AR0,>C8      * Test if LARK
         CMPR    1            * inst no 52
         BBZ     DISTVE
         LALK    >CC
         B       DISMNE DISTVE   LARK    AR0,>CA      * Test if LDPK
         CMPR    1            * inst no 53
         BBZ     DISTIR
         LALK    >D0
         B       DISMNE DISTIR   LARK    AR0,>CB      * Test if LACK
         CMPR    1            * inst no 54
         BBZ     DISFRT
         LALK    >D4
         B       DISMNE DISFRT   LARK    AR0,>CC      * Test if RPTK
         CMPR    1            * inst no 55
         BBZ     DISFFT
         LALK    >D8
         B       DISMNE DISFFT   LARK    AR0,>CF      * Test if EINT to NORM
         CMPR    1            * insts 56 to 90 inclusive
         BBZ     DISTWI       * ( / includes 4 blank instrs )
         LAC     OPCODE       * Save lower byte and lower nibble
         ANDK    >00FF
         SACL    TWON
         ANDK    >000F
         SACL    ONEN
         LAR     AR1,TWON     * Now Decode /
         LARK    AR0,>08      * Test if EINT to SSXM
         CMPR    1            * insts 56 to 63 inc
         BBZ     DISSTN
         LAC     ONEN
         SFL
         SFL
         ADLK    >DC
         B       DISMNE DISSTN   LARK    AR0,>0C      * Test if SPM
         CMPR    1            * inst 64
         BBZ     DISSVT
         LALK    >FC
         B       DISMNE DISSVT   LARK    AR0,>0D      * Test if RXF
         CMPR    1            * inst 65
         BBZ     DISETN
         LALK    >100
         B       DISMNE DISETN   LARK    AR0,>0E      * Test if SXF
         CMPR    1            * inst 66
         BBZ     DISNTT
         LALK    >104
         B       DISMNE
```

```
DISNTT  LARK    AR0,>10         * Test if FORT
        CMPR    1               * inst 67
        BBZ     DISTWN
        LALK    >108
        B       DISMNE DISTWN  LARK    AR0,>28         * Test if ABS to CMPL
        CMPR    1               * inst 68 to 88 inclusive
        BBZ     DISTWR          * (/ 4 blank insts )
        LAC     TWON
        SBLK    >13
        SFL
        SFL
        ADLK    >10C
        B       DISMNE DISTWR  LARK    AR0,>54         * Test if CMPR
        CMPR    1               * inst 89
        BBZ     DISTWF
        LALK    >160
        B       DISMNE DISTWF  LARK    AR0,>A2         * Test if NORM
        CMPR    0               * inst 90
        BBZ     COMERR
        LALK    >164
        B       DISMNE DISTWI  LARK    AR0,>E0         * Test if LRLK to XORK
        CMPR    1               * inst 91 to 97 inclusive
        BBZ     DISTWX
        LAC     OPCODE          * Fetch lower byte
        ANDK    >00FF
        SFL
        SFL
        ADLK    >168
        LARK    AR2,>1          * Two word inst so set flag
        SAR     AR2,FLAG
        B       DISMNE DISTWX  LARK    AR0,>F0         * Test if OUT
        CMPR    1               * inst 98
        BBZ     DISTWS
        LALK    >184
        B       DISMNE DISTWS  LAC     TWON            * Must be BV to B
        SBLK    >F0             * inst 99 to 114
        SFL
        SFL
        ADLK    >188
        LARK    AR2,>1          * Set flag = 1
        SAR     AR2,FLAG
        LARP    AR1
        LAR     AR1,TWON
        LARK    AR0,>FC         * If instruction = BKLP
        CMPR    0               *   then goto DISMNE
        BBNZ    DISMNE
        LARK    AR0,>FD         * If instruction = BKLD
        CMPR    0               *   then goto DISMNE
        BBNZ    DISMNE
DISBRA  LARP    AR2             * Instruction is a branch and
        MAR     *+              * is not BKLP OR BKLD
        SAR     AR2,FLAG        * so set flag = 2

DISMNE  ADLK    BONE            * OUTPUT OPCODE MNEMONIC
        TBLR    ONEN            * Fetch first letter of mnemonic
        LAR     AR1,ONEN        * Output letter
        CALL    MESSAG          * (use ONEN as a scratch-pad)
```

```
        ADLK    >1              * Point to next letter
        TBLR    ONEN            * Fetch secnd letter of mnemonic
        LAR     AR1,ONEN        * Output letter
        CALL    MESSAG ADLK    >1              * Point to next letter
        TBLR    ONEN            * Fetch third letter of mnemonic
        LAR     AR1,ONEN        * Output letter
        CALL    MESSAG ADLK    >1              * Point to next letter
        TBLR    ONEN            * Fetch last  letter of mnemonic
        LAR     AR1,ONEN        * Output letter
        CALL    MESSAG DISFAL  LARP    AR1             * ADRESS = ADRESS + 1
        LAR     AR1,ADRESS
        LARK    AR0,>1
        MAR     *0+
        SAR     AR1,ADRESS LARP    AR2             * If two word flag = 0
        LAR     AR2,FLAG        *   then goto DISADD
        LARK    AR0,>0
        CMPR    0
        BBNZ    DISADD,*,1

LARP    AR2
        LAR     AR2,MARK        * If mark = 0
        LARK    AR0,>0          *   then
        CMPR    0               *      goto DISNEW
        BBNZ    DISNEW          *   else
        LARP    AR0             *      mark = flag + 1
        LAR     AR0,FLAG
        MAR     *+              * flag=0,single wrd;1,two wrd;2,branch
        SAR     AR0,MARK        * mark=0,not SS mod;1,2,3,same as flag 0,1,2

DISNEW  LRLK    AR1,NEWLIN
        CALL    MESSAG

LAR     AR1,ADRESS      * Output next address
        LARK    AR2,+5
        CALL    OUTHEX LRLK    AR1,SPACE4      * Output 4 spaces
        CALL    MESSAG ZALS    ADRESS          * Fetch opcode from prog mem
        TBLR    OPCODE          * ACL = ADRESS  ; OPCODE = *ACL LAR     AR1,OPCODE      * Output opcode
        LARK    AR2,+6          * AR1 = OPCODE
        CALL    OUTHEX          * OUTHEX LARP    AR1             * ADRESS = ADRESS + 1
        LAR     AR1,ADRESS
        LARK    AR0,>1
        MAR     *0+
        SAR     AR1,ADRESS

DISADD  LAR     AR0,ENDADR
        CMPR    2
        BBZ     DISNAD

LARP    AR1             * If mark = 0
        LAR     AR1,MARK        *   then
        LARK    AR0,>0          *      goto MAIN
        CMPR    0               *   else
        BBZ     DISSSO          *      goto DISSSO (as mark = 1 or 2)
```

```
        LRLK    AR1,NEWLIN      * place CR in output
        CALL    MESSAG          * queue LRLK    AR1,NEWLIN      * place CR in output
        CALL    MESSAG          * queue

B       $DIS $DIS    B       MAIN            * Return to MAIN

PEND
        END
```

```
PC/CrossWare Family Linker v2.4 85.158  09/30/86  08:38:42           Page   1
Copyright (C) 1985, Texas Instruments Inc.  All Rights Reserved
Command List PHASE 0,S120
PROGRAM >E000
DATA >400
INCLUDE S120IO.MPO
INCLUDE S120H.MPO
INCLUDE S120CMD.MPO
INCLUDE S120DDM.MPO
INCLUDE S120DPM.MPO
INCLUDE S120FDM.MPO
INCLUDE S120FPM.MPO
INCLUDE S120MDM.MPO
INCLUDE S120MPM.MPO
INCLUDE S120DB.MPO
INCLUDE S120RUN.MPO
INCLUDE S120SB.MPO
INCLUDE S120SS.MPO
INCLUDE S120CB.MPO
INCLUDE S120DIS.MPO
INCLUDE S120PC.MPO
INCLUDE S120AR0.MPO
INCLUDE S120ACH.MPO
INCLUDE S120AR1.MPO
INCLUDE S120ACL.MPO
INCLUDE S120AR2.MPO
INCLUDE S120PRH.MPO
INCLUDE S120AR3.MPO
INCLUDE S120PRL.MPO
INCLUDE S120AR4.MPO
INCLUDE S120TOS.MPO
INCLUDE S120TRG.MPO
INCLUDE S120TMS.MPO
INCLUDE S120TH.MPO
INCLUDE S120BMS.MPO
INCLUDE S120DR.MPO
INCLUDE S120ST0.MPO
INCLUDE S120ST1.MPO
INCLUDE S120TEST.MPO
INCLUDE S120SAV.MPO
INCLUDE S120L01.MPO
INCLUDE S120L02.MPO
INCLUDE S120DOT.MPO
INCLUDE S120H.MPO
INCLUDE S120CAL.MPO
END
```

```
PC/CrossWare Family Linker v2.4 85.158  09/30/86  08:38:42           Page   2
Copyright (C) 1985, Texas Instruments Inc.  All Rights Reserved
Link Map Control File = S120.CTL Linked Output File = S120.LOD List File = S120.MAP Output Format = ASCII
```

PC/CrossWare Family Linker v2.4 85.158  09/30/86  08:38:42                    Page   3
Copyright (C) 1985, Texas Instruments Inc.  All Rights Reserved Phase 0      S120       Module Origin = 0000    Length = 0000

| Module   | No | Origin | Length | Type    | Date     | Time     | Creator |
|----------|----|--------|--------|---------|----------|----------|---------|
| S120IO   | 1  | E000*  | 0526   | INCLUDE | 09-26-86 | 07:26:46 | ASM320  |
| $DATA    | 1  | 0400*  | 004C   |         |          |          |         |
| S120M    | 2  | E526*  | 01FD   | INCLUDE | 09-26-86 | 07:21:10 | ASM320  |
| S120CMD  | 3  | E723*  | 001C   | INCLUDE | 08-08-86 | 13:15:36 | ASM320  |
| $DATA    | 3  | 044C*  | 0013   |         |          |          |         |
| S120DDM  | 4  | E73F*  | 00BC   | INCLUDE | 09-29-86 | 09:33:24 | ASM320  |
| S120DPM  | 5  | E7FB*  | 00A9   | INCLUDE | 09-29-86 | 10:52:28 | ASM320  |
| S120FDM  | 6  | E8A4*  | 00B7   | INCLUDE | 08-08-86 | 13:17:3? | ASM320  |
| S120FPM  | 7  | E95B*  | 008C   | INCLUDE | 08-08-86 | 13:18:19 | ASM320  |
| S120HDM  | 8  | E9E7*  | 013F   | INCLUDE | 08-08-86 | 13:19:01 | ASM320  |
| S120MPM  | 9  | EB26*  | 00D8   | INCLUDE | 08-08-86 | 13:20:08 | ASM320  |
| S120DB   | 10 | EBFE*  | 006B   | INCLUDE | 08-08-86 | 13:21:02 | ASM320  |
| S120RUN  | 11 | EC69*  | 007F   | INCLUDE | 09-26-86 | 07:31:33 | ASM320  |
| S120SB   | 12 | ECE8*  | 0092   | INCLUDE | 08-08-86 | 13:22:16 | ASM320  |
| $DATA    | 12 | 045F*  | 0017   |         |          |          |         |
| S120SS   | 13 | ED7A*  | 0159   | INCLUDE | 09-29-86 | 10:54:22 | ASM320  |
| S120CB   | 14 | EED3*  | 00B4   | INCLUDE | 08-08-86 | 13:23:50 | ASM320  |
| S120DIS  | 15 | EF87*  | 0431   | INCLUDE | 08-08-86 | 13:25:03 | ASM320  |
| S120PC   | 16 | F3B8*  | 0068   | INCLUDE | 08-08-86 | 13:26:45 | ASM320  |
| S120AR0  | 17 | F420*  | 005E   | INCLUDE | 08-08-86 | 13:27:16 | ASM320  |
| S120ACH  | 18 | F47E*  | 0068   | INCLUDE | 08-08-86 | 13:27:46 | ASM320  |
| S120AR1  | 19 | F4E6*  | 005E   | INCLUDE | 08-08-86 | 13:28:14 | ASM320  |
| S120ACL  | 20 | F544*  | 0068   | INCLUDE | 08-08-86 | 13:28:41 | ASM320  |
| S120AR2  | 21 | F5AC*  | 005E   | INCLUDE | 08-08-86 | 13:29:12 | ASM320  |
| S120PRH  | 22 | F60A*  | 0068   | INCLUDE | 08-08-86 | 13:29:40 | ASM320  |
| S120AR3  | 23 | F672*  | 005E   | INCLUDE | 08-08-86 | 13:30:12 | ASM320  |
| S120PRL  | 24 | F6D0*  | 0068   | INCLUDE | 08-08-86 | 13:30:44 | ASM320  |
| S120AR4  | 25 | F738*  | 0060   | INCLUDE | 08-08-86 | 13:31:11 | ASM320  |
| S120TOS  | 26 | F798*  | 0068   | INCLUDE | 08-08-86 | 13:31:38 | ASM320  |
| S120TRG  | 27 | F800*  | 0068   | INCLUDE | 08-08-86 | 13:32:06 | ASM320  |
| S120TMS  | 28 | F868*  | 0068   | INCLUDE | 08-08-86 | 13:32:33 | ASM320  |
| S120TM   | 29 | F8D0*  | 0048   | INCLUDE | 08-08-86 | 13:33:54 | ASM320  |
| S120BMS  | 30 | F918*  | 0068   | INCLUDE | 08-08-86 | 13:34:25 | ASM320  |
| S120DR   | 31 | F980*  | 01F1   | INCLUDE | 08-08-86 | 13:36:04 | ASM320  |
| S120ST0  | 32 | FB71*  | 0066   | INCLUDE | 08-08-86 | 13:36:57 | ASM320  |
| S120ST1  | 33 | FBD7*  | 0066   | INCLUDE | 08-08-86 | 13:37:24 | ASM320  |
| S120TEST | 34 | FC3D*  | 0243   | INCLUDE | 09-30-86 | 08:37:07 | ASM320  |
| S120SAV  | 35 | FE80*  | 0077   | INCLUDE | 08-08-86 | 13:14:59 | ASM320  |
| S120L01  | 36 | FEF7*  | 002C   | INCLUDE | 08-08-86 | 13:37:54 | ASM320  |
| S120L02  | 37 | FF23*  | 0030   | INCLUDE | 08-08-86 | 13:38:32 | ASM320  |
| S120DOT  | 38 | FF53*  | 000D   | INCLUDE | 08-08-86 | 13:44:33 | ASM320  |
| S120H    | 39 | FF60*  | 0047   | INCLUDE | 08-08-86 | 13:45:09 | ASM320  |
| S120CAL  | 40 | FFA7*  | 002D   | INCLUDE | 08-08-86 | 13:45:33 | ASM320  |

| Common | No | Origin | Length |
|--------|----|--------|--------|
| STORE  | 1  | 0476*  | 000A   |

PC/CrossWare Family Linker v2.4 85.158  09/30/86  08:38:42                    Page   4
Copyright (C) 1985, Texas Instruments Inc.  All Rights Reserved

DEFINITIONS

| Name   | Value | No | Name    | Value | No | Name    | Value | No | Name   | Value | No |
|--------|-------|----|---------|-------|----|---------|-------|----|--------|-------|----|
| COMERR | E56D* | 2  | COMNDS  | E732* | 3  | DDMADD  | 044D* | 3  | DISSSI | F198* | 15 |
| DISSSO | EDCD* | 13 | DPMADD  | 044C* | 3  | DRSSI   | FA4A* | 31 | DRSSO  | EE5B* | 13 |
| GETLIN | E20D* | 1  | GETWRD  | E573* | 2  | HOFLAG  | 040D* | 1  | INUMBR | E59D* | 2  |
| IOLOA1 | E320* | 1  | IOLOA2  | E421* | 1  | *LDACMD | 044C* | 3  | LDAINT | 0472* | 12 |
| LDAIO  | 0400* | 1  | LDAMON  | 044E* | 3  | LDASB   | 045F* | 12 | LDAUSR | 0450* | 3  |
| LOERMS | E710* | 2  | MAIN    | E53F* | 2  | MAIN2   | E547* | 2  | MENUST | E733* | 3  |
| MESSAG | E27A* | 1  | MSTART  | E526* | 2  | NEWLIN  | E723* | 3  | OUTHEX | E60A* | 2  |

| Name | Value | No | Name | Value | No | Name | Value | No | Name | Value | No |
|---|---|---|---|---|---|---|---|---|---|---|---|
| QURMSG | E726* | 3 | *RUN | EC89* | 11 | *RUNCMP | ECA2* | 11 | *RUNCON | ECC4* | 11 |
| *RUNEX | ECE2* | 11 | *RUNINC | ECBD* | 11 | *RUNMST | EC95* | 11 | RUNSSI | EC93* | 11 |
| RUNUSE | EC91* | 11 | SAV | FE80* | 35 | SBSSI | ED40* | 12 | SBSSO | EDFA* | 13 |
| SERINT | E088* | 1 | SPACE4 | E72D* | 3 | SPACE6 | E72B* | 3 | *SSCLB | EEAF* | 13 |
| *SSCLIT | EE9C* | 13 | *SSINT0 | EE60* | 13 | *SSINT1 | EE6E* | 13 | *SSINT2 | EE7D* | 13 |
| *SSINT3 | EE8C* | 13 | *SSNLN | EEC3* | 13 | STRTUP | E000* | 1 | *SYNERR | E6FD* | 2 |
| THINQ | E29C* | 1 | | | | | | | | | |

```
Length of Region for Task        = 0000
**** Linking Completed    09/30/86  08:41:15
```

What is claimed is:

1. A system for monitoring execution of a user program by a processor without using trap instructions, the system comprising:
   (a) means for defining a first software break point at a first address in the user program;
   (b) means for causing the processor to write the op code of a first call instruction into the first address;
   (c) means for causing the processor to write the op code of the first call instruction into the address immediately after the first address unless the first address is equal to a present count in a program counter, the argument of the first call instruction thereby being equal to its op code;
   (d) means for causing the processor to temporarily save the instructions at the first address and the address immediately following the first address;
   (e) means for causing the processor to execute the user program until the first address is encountered and means for causing the processor to execute the op code of the first call instruction;
   (f) means for storing a software monitor subroutine at an address equal to the op code of the first call instruction;
   (g) means for causing the processor to enter the software monitor subroutine at the address equal to the op code in the argument of the first instruction;
   (h) means for causing the processor to execute the first instruction, save the program count and the contents of other registers of the processor corresponding to the first software break point, and replace the first and second instructions at the first address and the address immediately following the temporarily saved instructions; and
   (i) means for displaying the saved program count and the saved contents of the other registers corresponding to the first break point.

2. The system of claim 1 wherein the defining means defines a plurality of additional software break points at a plurality of additional addresses, respectively, before execution of the user program.

3. The system of claim 2 wherein the processor is a microprocessor that includes only one trap instruction in its instruction set, whereby a user can monitor execution of the user program by the processor when the user program includes trap instructions.

4. The system of claim 3 including a terminal coupled to the processor for effectuating entry of a define-break-point-at-address monitor command and a single-step monitor command into the processor.

5. The system of claim 4 including means for causing the software monitor subroutine to return to a location after the displaying whereat the software monitor subroutine awaits a new monitor run command and means for responding to a new monitor run command entered by a user via the terminal to further execute the user program until a second address is encountered at which a second software break point is defined.

* * * * *